US011976003B2

(12) United States Patent
Ambuga Keshavamurthy et al.

(10) Patent No.: US 11,976,003 B2
(45) Date of Patent: May 7, 2024

(54) APPARATUS AND METHODS FOR MARKING OPTICAL FIBERS USING A DEFLECTED INK STREAM

(71) Applicant: CORNING INCORPORATED, Corning, NY (US)

(72) Inventors: Krishna Prasad Ambuga Keshavamurthy, Wilmington, NC (US); Aditya Kaimal, Wilmington, NC (US); Kelvin Nguyen, Fort Worth, TX (US)

(73) Assignee: Corning Incorporated, Corning, NY (US)

( * ) Notice: Subject to any disclaimer, the term of this patent is extended or adjusted under 35 U.S.C. 154(b) by 913 days.

(21) Appl. No.: 16/942,961

(22) Filed: Jul. 30, 2020

(65) Prior Publication Data

US 2021/0039991 A1 Feb. 11, 2021

Related U.S. Application Data

(60) Provisional application No. 62/882,765, filed on Aug. 5, 2019.

(51) Int. Cl.
*C03C 25/12* (2006.01)
*C03C 25/105* (2018.01)
*G02B 6/44* (2006.01)

(52) U.S. Cl.
CPC ............ *C03C 25/12* (2013.01); *C03C 25/105* (2013.01); *G02B 6/4482* (2013.01)

(58) Field of Classification Search
CPC ............................ C03C 25/12; C03C 25/105
See application file for complete search history.

(56) References Cited

U.S. PATENT DOCUMENTS

| 2,929,136 | A | 3/1960 | Karl et al. |
| 3,021,815 | A | 2/1962 | Joseph et al. |
| 3,434,456 | A | 3/1969 | Chester et al. |
| 3,595,994 | A | 7/1971 | Whitman |
| 3,709,432 | A | 1/1973 | Robertson |
| 3,807,025 | A | 4/1974 | Gudmestad |

(Continued)

FOREIGN PATENT DOCUMENTS

| EP | 1219428 A2 | 7/2002 |
| JP | 11-326714 A | 11/1999 |

(Continued)

*Primary Examiner* — Dah-Wei D. Yuan
*Assistant Examiner* — Kristen A Dagenais
(74) *Attorney, Agent, or Firm* — Kevin L. Bray

(57) ABSTRACT

A method of marking an optical fiber includes forming an ink stream, moving an optical fiber over a fiber path adjacent the ink stream, and intermittently deflecting the ink stream with a gas jet so that the optical fiber at least partially enters the deflected ink stream so that the ink from the deflected ink stream forms spaced apart marks on the optical fiber outer surface. An optical fiber marking apparatus is also disclosed that includes payout and take modules that move the optical fiber over the fiber path, a marking unit configured to form an ink stream adjacent the fiber path, and an ink stream deflection device that causes the ink stream to deflect and overlap the fiber path so that ink from the ink stream forms spaced apart marks on the outer surface of the optical fiber.

15 Claims, 21 Drawing Sheets

(56) References Cited

U.S. PATENT DOCUMENTS

| | | | |
|---|---|---|---|
| 4,190,844 A | 2/1980 | Taylor | |
| 4,530,750 A | 7/1985 | Aisenberg et al. | |
| 4,619,842 A | 10/1986 | Moss et al. | |
| 4,629,285 A | 12/1986 | Carter et al. | |
| 5,119,464 A * | 6/1992 | Freychet | C03C 25/143 385/901 |
| 5,151,306 A | 9/1992 | Andrews et al. | |
| 5,377,292 A | 12/1994 | Bartling et al. | |
| 5,796,905 A | 8/1998 | Hoffart et al. | |
| 6,306,204 B1 * | 10/2001 | Lin | C09D 11/38 106/31.89 |
| 6,404,972 B1 | 6/2002 | Pasch et al. | |
| 6,576,591 B1 | 6/2003 | Snowdon et al. | |
| 6,650,815 B2 | 11/2003 | Hawtof et al. | |
| 6,866,370 B2 | 3/2005 | Jeanmaire | |
| 7,072,554 B2 | 7/2006 | Watanabe et al. | |
| 8,104,879 B2 | 1/2012 | Barbet | |
| 8,768,128 B1 | 7/2014 | Garner et al. | |
| 8,865,005 B2 | 10/2014 | Garcia Da Fonseca et al. | |
| 10,801,883 B2 | 10/2020 | Dunn et al. | |
| 2002/0075073 A1 * | 6/2002 | Muza | H03F 1/308 330/253 |
| 2003/0202763 A1 * | 10/2003 | Starodubov | C03C 25/12 385/128 |
| 2015/0352861 A1 | 12/2015 | Isaji et al. | |
| 2017/0045706 A1 * | 2/2017 | Carberry | B41J 3/4073 |
| 2020/0215825 A1 | 7/2020 | Kaimal et al. | |

FOREIGN PATENT DOCUMENTS

| | | |
|---|---|---|
| JP | 2004-157193 A | 6/2004 |
| JP | 2016-206211 A | 12/2016 |
| WO | 2001/046738 A1 | 6/2001 |
| WO | 2007/133421 A1 | 11/2007 |

\* cited by examiner

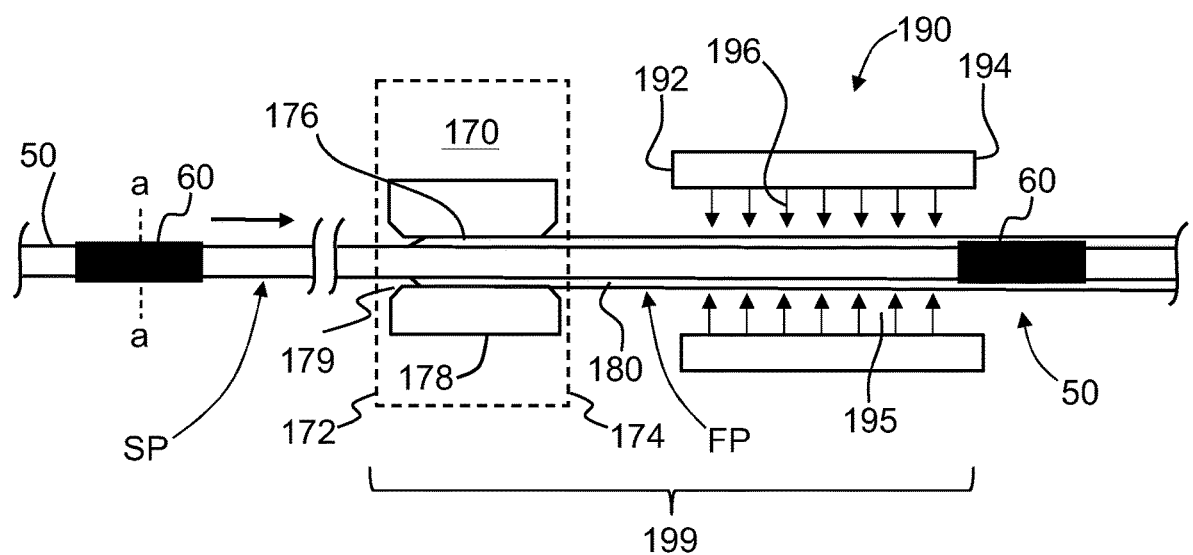
FIG. 9
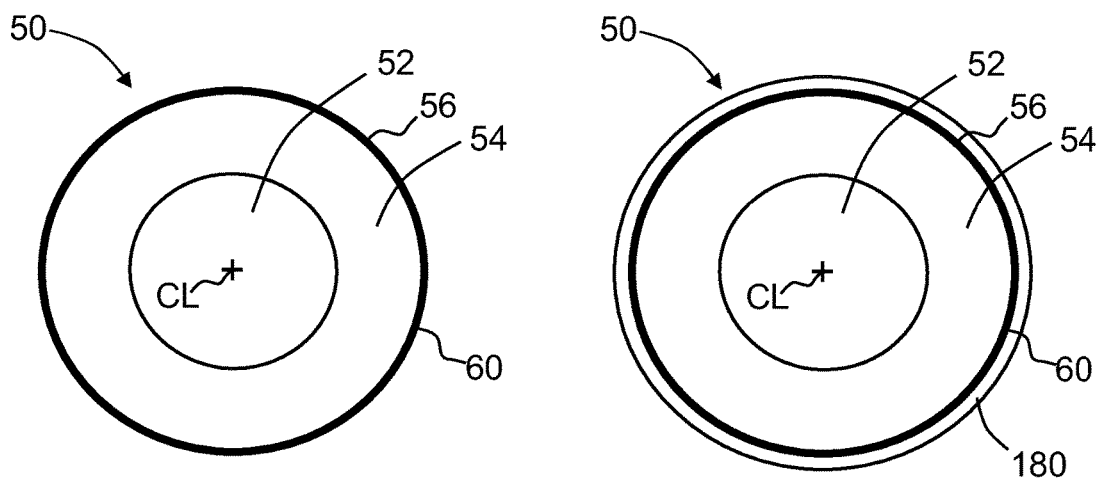
FIG. 10A        FIG. 10B

APPARATUS AND METHODS FOR MARKING OPTICAL FIBERS USING A DEFLECTED INK STREAM

This Application claims priority under 35 USC § 119(e) from U.S. Provisional Patent Application Ser. No. 62/882,765, filed on Aug. 5, 2019, and which is incorporated by reference herein in its entirety.

FIELD

The present disclosure relates to optical fibers, and in particular relates to apparatus and methods for marking of optical fibers using a deflected ink stream.

BACKGROUND

Optical fiber cables are used extensively in optical telecommunications systems. Certain types of optical fiber cables used for transmitting large amounts of data include many individual optical fibers, with the fiber count ranging from just a few to hundreds, depending on the particular application. A coding scheme can be employed so that the individual optical fibers can be identified. Such coding schemes can include fiber color or individualized markings on the outer surface of the optical fibers.

A problem with color-based coding schemes is that there are not enough colors for effectively color coding more than about eighteen optical fibers. A problem with marking the outer surface of optical fibers is that the present-day methods and apparatus used to perform the marking need to be relatively slow to obtain high-quality marks, i.e., marks without gaps, missing material, uneven marking, etc. This is particularly true when trying to mark optical fibers using an inkjet from an inkjet printer head.

SUMMARY

The apparatus and methods disclosed herein generally include moving an optical fiber over a fiber path that includes a marking location defined by a marking unit. The marking unit is configured to dispense marking material in the form of a stream of marking material, referred to herein generally as an ink stream. Marks are produced on the optical fiber by intermittently adjusting (deflecting) the ink stream path with a gas jet so that the ink stream path intersects the fiber path so the optical fiber at least partially passes through ink stream for a short time duration so that the ink from the ink stream coats a select axial length of the optical fiber over at least a portion of its outer surface as the optical fiber moves over the fiber path. In an example, the marks are ring marks that cover the circumference of the optical fiber. The ink stream deflection device includes a flow control device that controls the gas jet by either turning the gas jet on and off or redirecting or blocking a continuous gas jet to provide the intermittent deflection of the ink stream path. A controller controls the operation of the ink stream deflection device to define the axial length of the marks as well as the spacing between adjacent marks. Different colored inks can be used to form the ink stream to provide additional visibility and/or for identification purposes without modifying the optical fiber transmission characteristics. The marked optical fiber can then be further processed, e.g., the marks can be dried and then a protective overcoat added to protect the marks from wear and tear. The protective overcoat can be transparent and colored (tinted) to provide additional visibility and/or for identification. The marking systems and methods can be applied directly after drawing the optical fiber or later in the process of defining the final form of the optical fiber.

In various examples, the marking systems and methods disclosed herein enable the speed of the optical fiber over the optical path (i.e., the fiber speed or line speed) to be relatively high, e.g., greater than 10 meters per second (m/s) or greater than 20 m/s or greater than 30 m/s or greater than 40 m/s or greater than 50 m/s.

Because the ink stream is continuous, the process window for forming marks is much larger than for inkjet printing of marks because there is no need to control or direct ink droplets from an inkjet printer head onto the outer surface of the optical fiber. In addition, the quality of the marks is generally better than those obtained using inkjet-based marking. The use of an ink stream allows for many different types of inks to be used, including those having a relatively wide range of viscosities.

An embodiment of the disclosure is directed to a method of marking an optical fiber having an outer surface, comprising: forming from ink an ink stream that moves over an ink stream path; moving an optical fiber over a fiber path that resides adjacent and spaced apart from the ink stream; and directing a gas jet to be incident upon the ink stream to form a deflected ink stream that moves over a deflected ink stream path, the optical fiber at least partially entering the deflected ink stream.

Another embodiment of the disclosure is directed to a method of marking an optical fiber, comprising: causing at least one optical fiber to move over a fiber path that resides adjacent and spaced apart from an ink stream comprising ink, wherein the at least one moving optical fiber has an outer surface; intermittently deflecting the ink stream with a gas jet made intermittently incident upon the ink stream to form an intermittently deflected ink stream, at least a portion of the moving optical fiber intermittently entering the intermittently deflected ink stream forming wet marks on the outer surface of the at least one moving optical fiber; drying the wet marks at a drying location to form dried marks; and applying a substantially transparent protective coating over the dried marks and the outer surface of the at least one moving optical fiber, wherein the dried marks are visible through the substantially transparent protective coating.

Another aspect of the disclosure is directed to an optical fiber marking apparatus for marking an optical fiber having an outer surface, comprising relative to a fiber path: a payout module and a take-up module respectively configured to pay out and take up the optical fiber while moving the optical fiber over the fiber path at a fiber speed; a marking unit disposed downstream of the payout module and at a marking location, the marking unit configured to form an ink stream of ink adjacent and spaced apart from the fiber path; and an ink stream deflection device operably disposed relative to the marking unit, the ink stream deflection device adapted to intermittently deflect the ink stream to form an intermittently deflected ink stream, the intermittently deflected ink stream intersecting the moving optical fiber.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which:

FIG. 9 is a close-up view of the marked optical fiber passing through the overcoating system of optical fiber marking apparatus of FIG. 1A.

FIG. 10A is a cross-sectional view of the marked but uncoated optical fiber as taken along the line a-a in FIG. 9 at a location of a mark.

FIG. 10B is similar to FIG. 10A and illustrates the marked optical fiber with a protective overcoat.

DETAILED DESCRIPTION

Figure 1A:
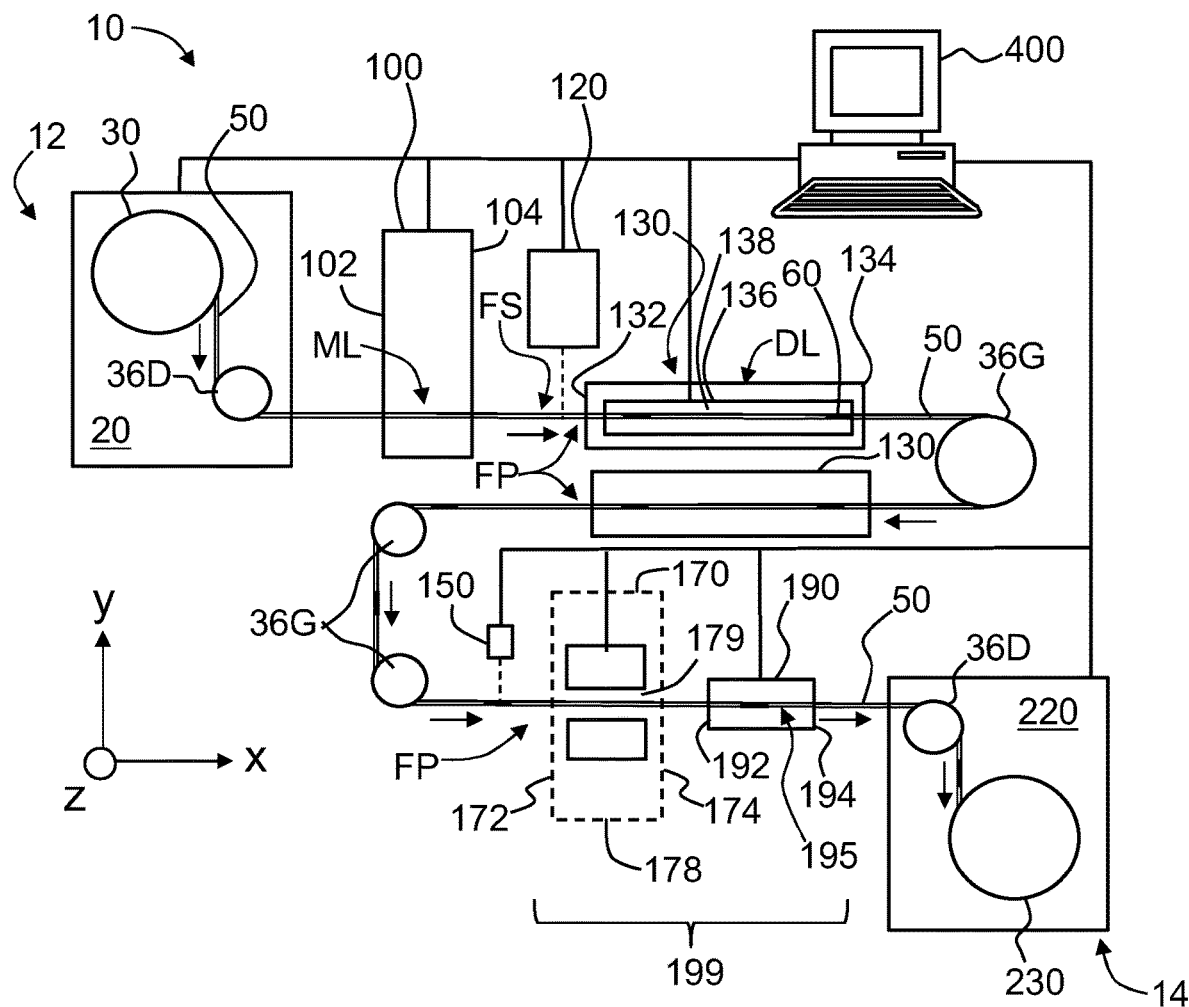
FIG. 1A is a schematic diagram of an example high-speed optical fiber marking apparatus for marking an optical fiber as disclosed herein.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Likewise, relative terms like top, bottom, side, horizontal, vertical, etc. are used for convenience and ease of explanation and are not intended to be limiting as to direction or orientation. In some cases, the term "vertical" means aligned with the direction of gravity and the term "horizontal" means in a plane perpendicular to vertical.

The terms "downstream" and "upstream" are used herein to indicate positions relative to the direction of the movement of the optical fiber over a fiber path through the high-speed optical fiber marking apparatus as described below. Thus, an apparatus component B that is downstream (upstream) of an apparatus component A processes a given section of the optical fiber after (before) it is processed by the apparatus component A.

The number density of marks is denoted as N and is the number of marks per unit length, and is given as the number of marks per meter (m) unless stated otherwise.

The abbreviation "μm" is used to denote "micron" or "micrometer," with the abbreviation "nm" is used to denote "nanometer."

The "fiber speed" is denoted by SF and is the speed at which the optical fiber moves over the fiber path through the high-speed optical fiber marking apparatus, and is also referred to as the "line speed."

The term "ink" used herein as shorthand for any liquid material that can be formed into a stream and that can be used to form a mark on the outer surface of an optical fiber.

The term "mark" as used herein is used to denote any type of simple indicia formed on an outer surface of the optical fiber over an axial mark length LM using the ink.

The term "ink stream" means a flow of ink (as defined above), wherein the flow is continuous for at least an amount of time sufficient for the ink of the ink stream to mark the optical fiber as the ink stream is deflected from its normal or nominal path into the fiber path to make contact with the optical fiber, and then to leave the fiber path to return to its normal or nominal (non-deflected) flow or other flow direction that has no contact with the optical fiber. In an example, the ink stream is already established and flowing past the optical fiber without contacting the optical fiber when the ink stream is deflected toward the optical fiber to make contact with the optical fiber and continues flowing without interruption until after the ink stream is redirected such that it no longer makes contact with the optical fiber. In one example, the ink stream flow is continuous for at least the time for two deflections of the ink stream onto the optical fiber to form at least two marks on the optical fiber. In another example, the flow of the ink stream is continuous for multiple deflections onto and off of the optical fiber to form more than two marks, such as for forming ten marks or fifty marks or one hundred marks or many hundreds of marks, etc. The ink stream as considered herein differs from an ink jet in that an ink jet consists of individual droplets that are charged and then deflected by charged deflection plates. The droplets are discrete and spaced apart from one another. In contrast, the ink stream as considered herein has a flow volume such that the ink stream is not discernable as individual droplets of ink and is not readily amenable to charge-based deflection. Said differently, an ink jet provides a plurality of discrete ink droplets with discernible and regular gaps therebetween, and the ink stream described herein constitutes a continuous flow of ink uninterrupted by gaps that are substantially smaller than the length of the ink stream. A typical ink droplet is no larger than about 100 microns in diameter (e.g., typically 50 microns to 70 microns), whereas the length of a given ink stream considered herein is substantially larger than that of a single ink droplet, i.e., the length of the ink stream (as measured between successive gaps in the ink stream) is substantially larger than the size (diameter) of one ink droplet, such as at least twice the size of typical ink droplet or at least four times the size of typical ink droplet or at least ten times the size of typical ink droplet or at least fifty times the size of typical ink droplet or at least one hundred times the size of typical ink droplet or at least one thousand times the size of a typical ink droplet.

The term "intermittent" can mean periodic, quasi-periodic, aperiodic or any other type of recurrence consistent with the fiber marking systems and methods disclosed herein.

The term "intersecting" when used to describe the deflected ink stream intersecting the optical fiber (or the deflected ink stream path intersection the fiber path) can include a partial overlap or a complete overlap of the deflected ink stream and the optical fiber (or of the deflected ink stream path and the fiber path).

Optical Fiber Marking Apparatus

FIG. 1A is a schematic diagram of an optical fiber marking apparatus ("apparatus") 10 for marking an optical fiber ("fiber") 50. The apparatus 10 has a first or starting end 12 and a second or finishing end 14. The fiber 50 is subjected to various processes (described below) and is in various states as it passes through the apparatus 10. Portions of the fiber 50 can differ in state or configuration along its length as it is being processed, such as unmarked, marked, marked but not covered (with a protective overcoat), and marked and covered (overcoated). It will be apparent to one skilled in the art based on the context of the discussion, the various Figures and the particular portion of the fiber 50 being discussed as to which state or configuration of the fiber is being considered.

Figure 1B:
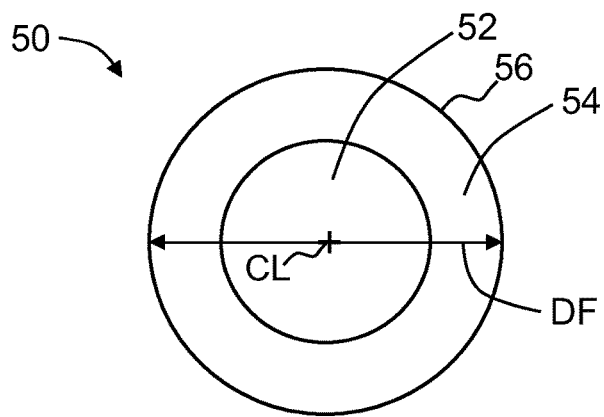
FIG. 1B is a close-up cross-sectional view of an example unmarked optical fiber.

The section of the fiber 50 upstream of marking location ML (see also FIG. 1C) is unmarked. The (unmarked) fiber 50 is shown in cross-sectional view in FIG. 1B. The fiber 50 comprises a glass fiber 52 that includes a glass core and a glass cladding (not shown separately), and a coating 54 that includes one or more layers designed to prevent damage to the glass fiber 52 when the fiber 50 is handled or subjected to stress. The coating 54 is common to most optical fibers and is typically a polymer (e.g. acrylate or urethane). In a typical configuration, the coating 54 includes a low-modulus primary layer adjacent the glass fiber 52 and a high-modulus secondary layer adjacent the primary layer. The fiber 50 has an outer surface 56, which in FIG. 1B is defined by the coating 54 but can also be defined by a protective overcoat as explained below. The fiber 50 has a centerline CL that defines an axial direction down the fiber. The fiber 50 has a diameter DF.

With reference again to FIG. 1A, the apparatus 10 includes at the first end 12 a payout module 20. The payout module includes a storage reel 30 that stores a length of unmarked fiber 50. The apparatus 10 also includes at the second end 14 a take-up module 220. The take-up module 220 includes a storage reel 230 that stores the fiber 50 after it has been marked and optionally covered with a protective overcoat by the apparatus 10, as explained below. The payout module 20 and the take-up module 220 each include a drive pulley 36D used to drive the fiber 50 over a fiber path FP through the apparatus 10 from the payout module 20 to the take-up module 220. In an example, the fiber path FP is defined at least in part by one or more guide pulleys 36G, such as the multiple guide pulleys as arranged and shown in FIG. 1A. Other arrangements of the guide pulleys 36G can also be effectively employed in the apparatus 10. The fiber 50 has a fiber speed SF over the fiber path FP as defined by the drive pulleys 36D. In the example configuration of FIG. 1A, the most upstream drive pulley 36D and the first downstream guide pulley 36G define a fiber span FS that is under tension.

The apparatus 10 further includes at least one marking unit 100 that resides downstream of the payout module 20 and upstream of the take-up module 220. A single marking unit 100 is shown in the apparatus 10 by way of example. The marking unit 100 is positioned adjacent the fiber path FP, as explained in greater detail below. The marking unit 100 has an (upstream) input end 102 that receives unmarked fiber 50 and a (downstream) output end 104 that delivers marked fiber to downstream units of apparatus 10.

Figure 1C:
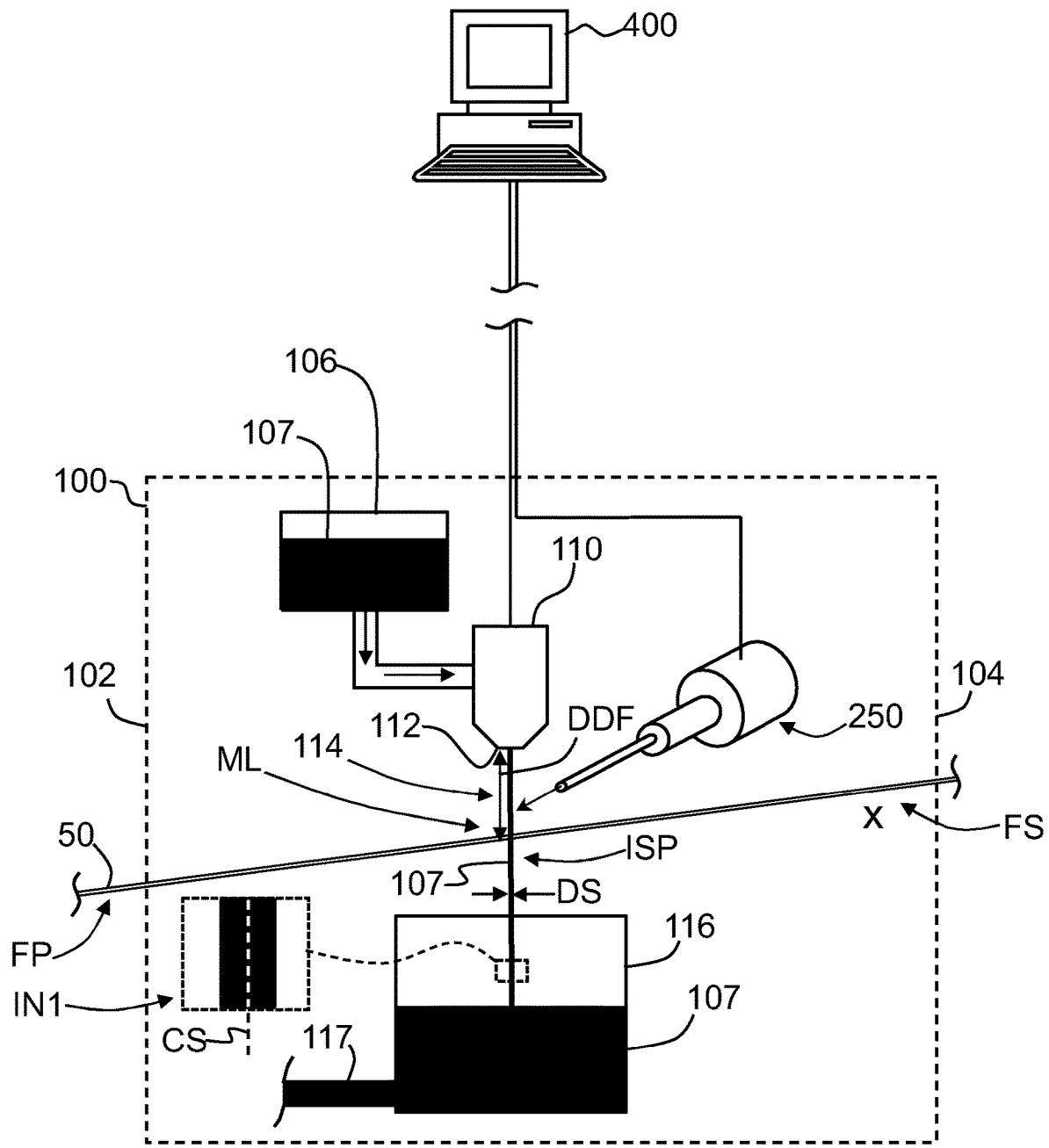
FIG. 1C is a close-up view of a marking unit of the apparatus along with a schematic depiction of an example ink stream deflection device.

FIG. 1C is a close-up view of an example marking unit 100. The marking unit 100 includes an ink supply 106 that supplies ink 107 to an ink dispenser 110 having an output end 112. The ink dispenser 110 outputs the ink 107 at the output end 112 the form of an ink stream 114 that defines a marking location ML on the optical fiber when the ink stream 114 is deflected to make contact with the fiber 50. In an example, the output end 112 can include or be configured as a nozzle that defines a diameter DS of the ink stream. In an example, the nozzle can be configured to start and stop the flow of the ink stream, e.g., electrically controlled under the direction of the controller 400 (introduced and discussed below). The ink stream 114 is shown as running (flowing) in the −y direction along an ink stream path ISP while the fiber 50 runs in the +x direction along the fiber path FP. More generally, the relative direction of the ink stream path ISP and the fiber path FP can be any reasonable direction other than parallel, with a preferred relative direction for some applications substantially perpendicular, e.g., with the ink stream path running in the vertical direction (i.e., along the direction of gravity) and the fiber path FP residing substantially in a horizontal plane to the vertical direction. The close-up inset IN1 shows a close-up view of the ink stream 114 showing a central axis CS of the ink stream that runs in the −y direction.

The ink 107 from the ink stream 114 that is not used forming marks 60 on the fiber 50 (the marking process is explained below) is collected by a container 116. A conduit (pipe) 117 that leads from the container 116 can be used to carry away the collected ink 107 so that it can be recycled (e.g., back to the ink supply 106) or disposed of. The ink stream 114 has a diameter DS. In general, the ink stream diameter DS can be any reasonable value for forming marks 60. An advantage of using an ink stream 114 over a conventional ink jet from an ink jet printer head that emits bursts of ink droplets is that the ink stream can have essentially an arbitrary size. In one example, the ink stream diameter DS can be in the range 20 µm≤DS≤5000 µm, or 50 µm≤DS≤5000 µm, or 100 µm≤DS≤5000 µm, or 250 µm≤DS≤5000 µm. In other examples, the ink stream diameter DS can be at least as large as half of the fiber diameter DF, and in other examples the ink stream diameter DS satisfies (0.5)·DF≤DS≤10·DF or DF≤DS≤5·DF or DF≤DS≤3·DF. The portion of the fiber 50 downstream of the marking location ML is marked fiber.

With reference again to FIG. 1A, an optional position sensor 120 can be disposed immediately downstream of the marking unit 100 and operably arranged relative to the fiber path FP to measure a displacement of the fiber 50 relative to a reference position, such as a nominal or ideal fiber path. A dryer unit 130 resides downstream of the position sensor 120 and includes an input end 132 for receiving the marked fiber 50 and an output end 134 for delivering the marked fiber in a state in which the ink 107 used to make the marks 60 has dried. The dryer unit 130 defines a drying location DL along the fiber path FP. In an example, the dryer unit 130 comprises a dryer tube 136 with an interior 138 through which the fiber path FP passes. In an example, a second dryer unit 130 is arranged along the fiber path FP to ensure mark drying in the case of high fiber speeds.

In an example, a mark counter 150 resides immediately downstream of the dryer unit 130 and is operably arranged relative to the fiber path FP to count the number of marks 60 to ensure that the proper number of marks per unit length (i.e., the mark number density N) is being generated by the apparatus 10. An overcoat applicator 170 resides downstream of the marking counter 150 and includes an input end 172 that receives the marked fiber 50 and an output end 174 that delivers a covered (overcoated) fiber. The fiber path FP passes through the overcoat applicator 170. In an example, the overcoat applicator 170 includes a coating tube or die 178 with an interior 179 through which the fiber path FP passes.

A curing system 190 resides immediately downstream of the overcoat applicator 170 and has an input end 192 for receiving the now marked and covered (overcoated) fiber 50 with an uncured overcoat, an output end 194 for delivering marked and covered fiber with a cured overcoat 180, and an interior 195, with the fiber path FP passing through interior. The combination of the overcoat applicator 170 and the curing system 190 defines an overcoating system 199.

The aforementioned take-up module 220 resides immediately downstream of the curing system 190 at the second (finishing) end 14 of the apparatus 10 and takes up the marked and overcoated fiber 50 onto the storage reel 230.

The apparatus 10 also includes a controller 400 that is operably connected one or more of the payout module 20, the take-up module 220, the one or more marking units 100, the ink stream deflection device 250, the position sensor 120, the dryer unit 130, the mark counter 150, and the overcoating system 199. The controller 400 is configured to control these apparatus components and the overall operation of the apparatus 10, including the fiber speed (line speed) SF of the fiber 50 through the apparatus 10 over the fiber path FP. In an example, the controller 400 controls marking unit 100 to start and stop the ink stream 114. In some examples, the controller 400 starts the flow of the ink stream 114 at the start of the marking process and then terminates the flow of the ink stream when the fiber marking process is completed.

In an example, the controller 400 comprises a programmable logic controller (PLC) configured to carry out instructions (software, firmware, etc.) embodied in a non-transitory computer-readable medium and that cause the apparatus 10 to carry out the methods disclosed herein. In some examples, the controller 400 need not be connected to and control some of the apparatus components that could be operated independently.

While the fiber speed SF can be relatively slow (e.g., 0.5 m/s), the apparatus and methods disclosed herein are particularly useful for fiber speeds in excess of about 2 m/s or 5 m/s or 10 m/s. In an example, apparatus and methods disclosed herein can operate at fiber speeds SF of greater than 2 m/s, or greater than 5 m/s or greater than 10 m/s or greater than 20 m/s, or greater than 30 m/s, or greater than 40 m/s or greater than 50 m/s.

Ink Stream Deflection Device

Figure 2A:
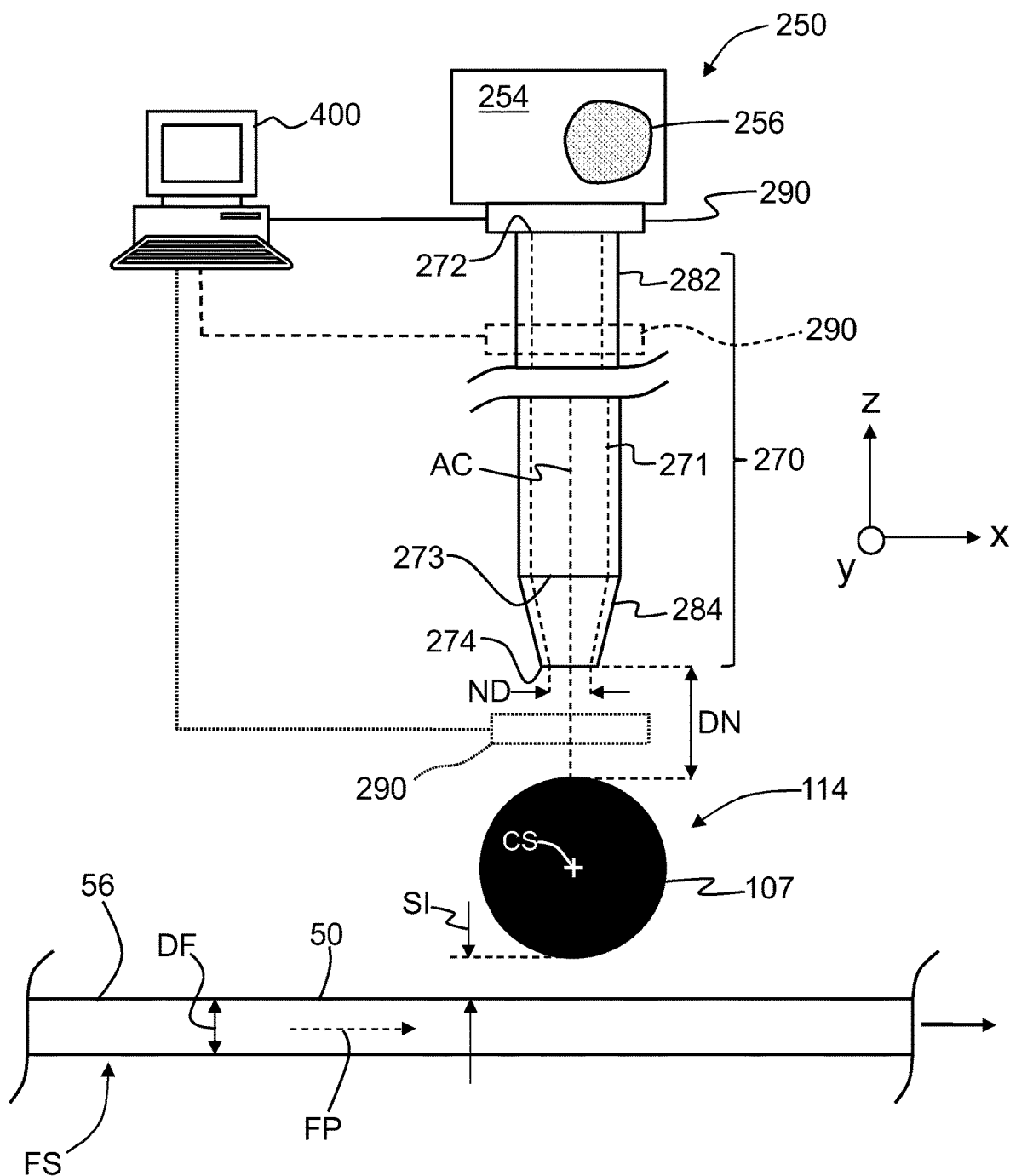
FIG. 2A is a close-up top-down view of an example ink stream deflection device illustrating example positions of a flow control device that constitutes a component of the ink stream deflection device.

FIG. 2A is a close-up top-down view of an example ink stream deflection device 250 of the marking unit 100. A schematic representation of an ink stream deflection device 250 is also shown in FIG. 1C. The ink stream deflection device 250 is arranged adjacent the fiber path FP proximate to the marking location ML in the apparatus 10 and thus proximate to the ink stream path ISP of the ink stream 114. The ink stream 114 has a central axis CS that runs, in the embodiment shown in FIG. 2A, in the y-direction down the center of the ink stream.

The ink stream deflection device 250 includes a pressurized gas source 254 that contains a pressurized gas 256, such as air or nitrogen, oxygen, etc. The pressurized gas source is pneumatically connected to a proximal end 272 of at least one gas conduit 270, which also has a distal end 274 that serves as an output end for the pressurized gas. The gas conduit 270 has a channel 271 and a central axis AC that runs down the center of the channel. In an example, the gas conduit 270 includes a main section 282 that includes the proximal end 272, and an opposite end 273. In an example, the main section 282 comprises a pipe or flexible tube. The example gas conduit 270 can include a nozzle 284 attached to the end 273 of the main section 282, wherein the nozzle tip defines the distal end 274. In another example, a section of the gas tube 270 adjacent the distal end 274 can be formed as a nozzle 284. The channel 271 of the gas conduit 270 can have a circular cross-sectional shape, an oval cross-section shape, elongate cross-sectional, rectangular cross-sectional shape, etc. The nozzle 284 can define a converging portion of the channel 271, as shown in FIG. 2A. The nozzle 284 (or the output end 274 of the channel 271 of the gas conduit 270) has a nozzle diameter ND.

Multiple gas conduits 270 can be used and a single gas conduit is shown and discussed by way of example and for ease of explanation.

In an example, the ink stream deflection device 250 includes a flow control device 290 arranged and configured to control the flow of the pressurized gas 256. In an example, the flow control device 290 is operably connected to and controlled by the controller 400.

In one example, the flow control device 290 controls the flow of pressurized gas 256 into the gas conduit 270 from the pressurized gas source 254, as shown in FIG. 2A. In another example, the flow control device 290 controls the flow of pressurized gas within the gas conduit, as shown by the dashed line flow control device in FIG. 2A. Examples of such flow control devices 290 comprises valve (e.g., an electro-mechanical or electromagnetic valve) of the type known and used in the art of pressurized pneumatic gas systems and that can be switched between an open (on) state and a closed (off) state with a control signal. In yet another example, the flow control device 290 controls the flow of pressurized gas 256 after it has exited the output end 274 of the gas conduit, as shown by the dotted-line flow control device 290 in FIG. 2A. Various examples of the flow control device 290 are explained below.

FIG. 2A shows the ink stream deflection device 250 wherein the flow control device 290 is in an off (closed) state so that no pressurized gas 256 reaches the ink stream 114. FIG. 2A also shows the ink stream 114 spaced apart from the outer surface 56 of the fiber 50 by a distance SI. In an example, the distance SI is in the range from 0.5 mm to 3 mm, with 1 mm being a good example distance. The distance from the distal (output) end 274 of the gas conduit 270 to the ink stream 114 is denoted DN and is referred to herein as the "nozzle distance." In an example, the nozzle distance DN is in the range from 1 mm to 5 mm, with 2 mm being a good example distance. The axial or y-distance from the output end 112 of the ink dispenser 110 to the y-location of the fiber 50 along the ink stream path ISP is denoted DDF (see FIG. 1C and FIG. 2D) and is referred to as the dispenser-fiber distance. An example dispenser-fiber distance DDF can be in the range from 8 mm to 12 mm.

Figure 2B:
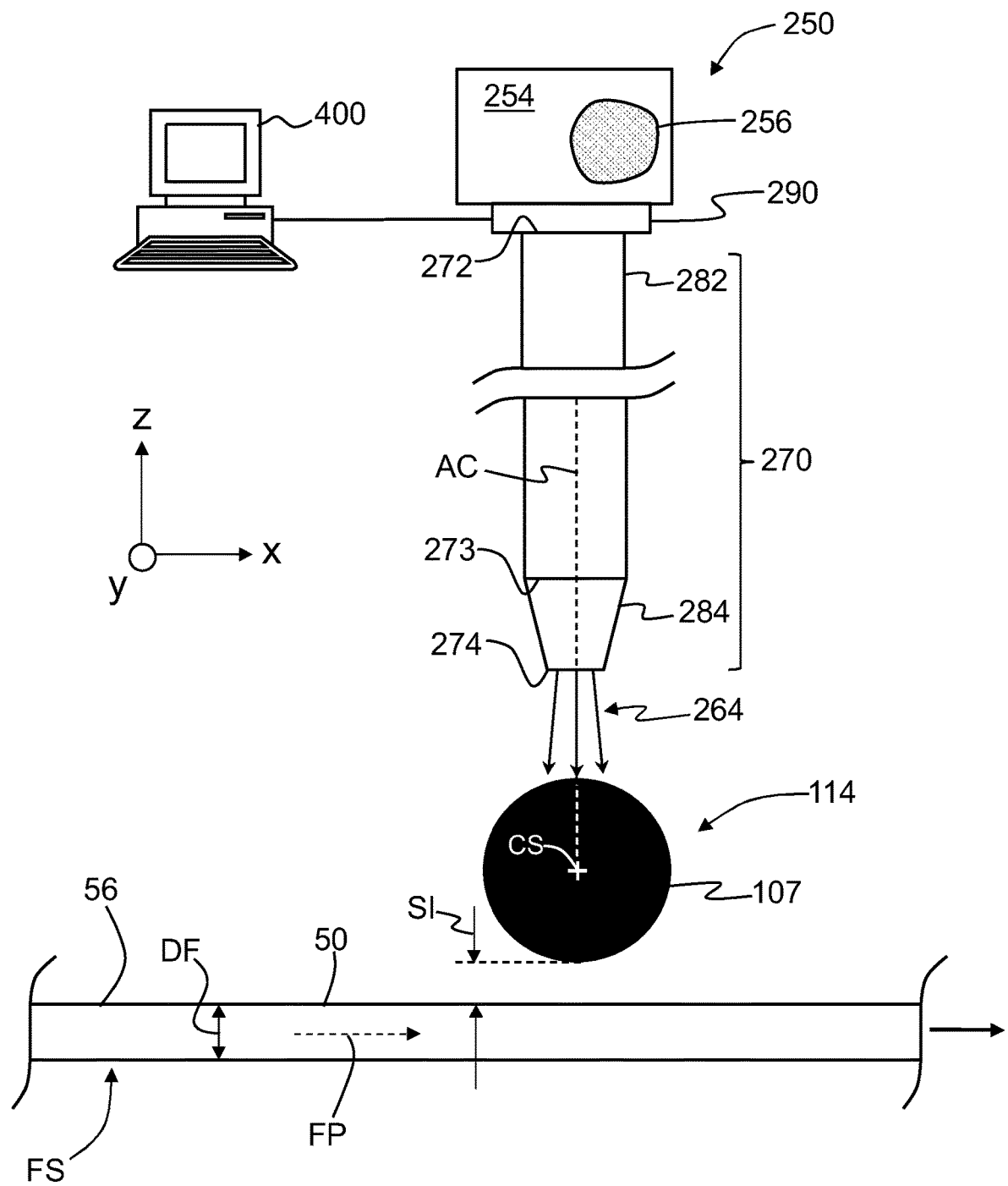
FIG. 2B is similar to FIG. 2A and shows a gas jet from the flow control device initially incident upon the ink stream.

FIG. 2B is similar to FIG. 2A except that the flow control device 290 is now in the on state (open position). In the present example where the flow control device 290 resides between the pressured gas source 254 and the gas conduit 270, the pressurized gas 256 can now flow from the pressurized gas source 254 into and through the gas conduit 270 and out the output end 274 of the gas conduit. The outputted pressurized gas 256 forms a gas jet 264. The gas jet 264 is directed at the ink stream 114 and is made incident thereon. In an example, the gas jet 264 is centered on the gas conduit central AC, which intersects the ink stream central axis CS so that the gas jet directly impinges upon the ink stream 114. FIG. 2B shows the initial formation of the gas jet 264 and the initial contact of the gas jet 264 with the ink stream 114 but prior to deflection of the ink stream. Note that in an example where multiple gas conduits 270 are employed, multiple gas jets 264 are formed and directed for example at different axial locations of the ink stream.

Figure 2C:
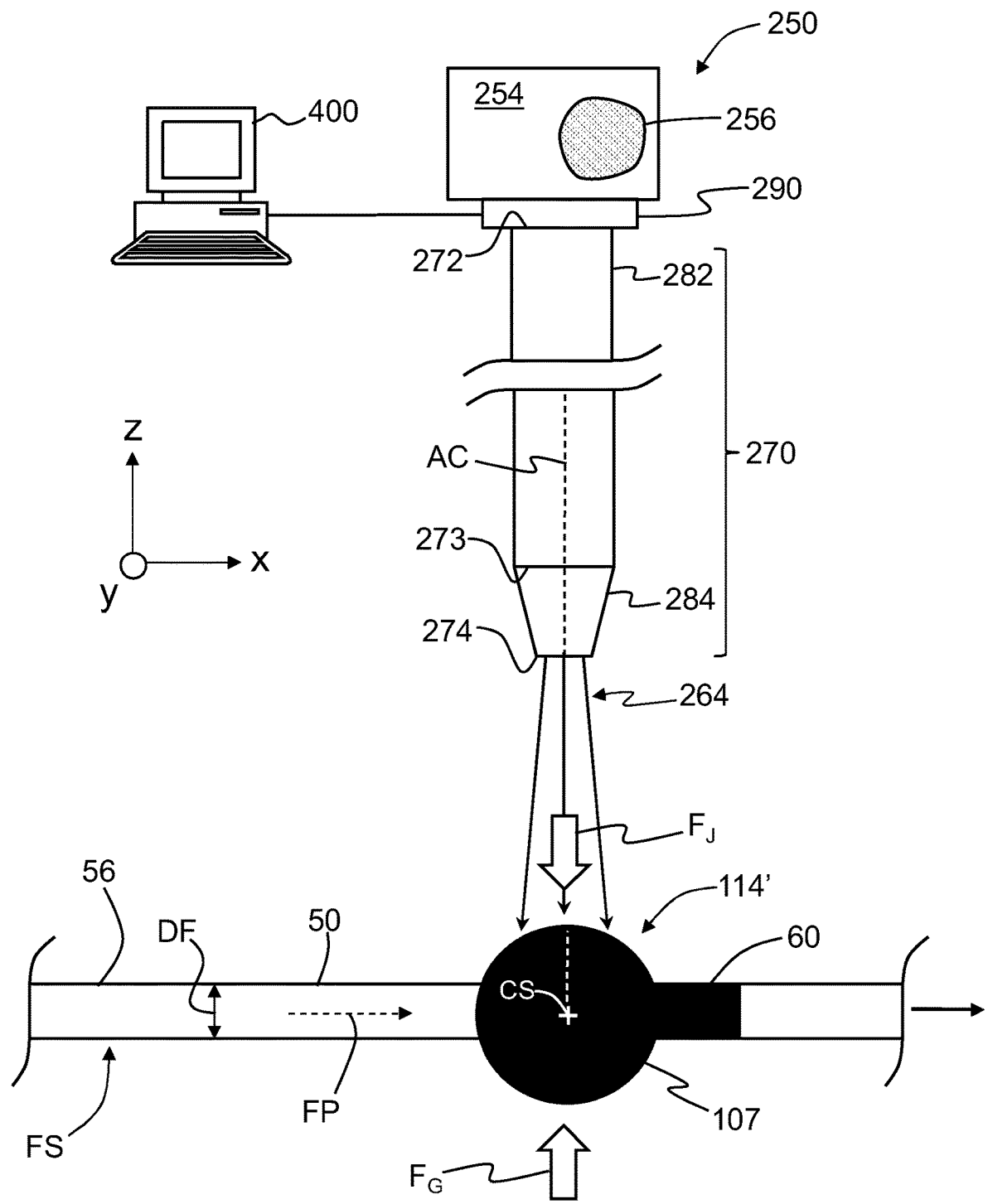
FIG. 2C is similar to FIG. 2B and shows how the force of the gas jet on the ink stream deflects the ink stream into the fiber path to form a mark on the optical fiber as the optical fiber moves through the deflected ink stream.

FIG. 2C is similar to FIG. 2B but slightly later in time when the gas jet 264 has pushed the ink stream 114 in the −z direction into the fiber path FP so that the fiber 50 intersects the ink stream. Note that the movement of the fiber 50 along the fiber path FP while the fiber is immersed in (on contact with) the deflected ink stream 114' initiates the formation of the mark 60 on the fiber.

The gas jet pressure $P_J$ (force per area) is selected so that the force $F_J$ on the ink stream 114 balances the restoring force of gravity $F_G$ that seeks to place the new (deflected) ink stream path ISP' back to the original ink stream path ISP, which is in the vertical direction as defined by the direction of gravity. It is also noted that in an example the fiber 50 is located such that the portion of the deflected ink stream 114' that intersects the fiber is substantially intact, i.e., the portion of the deflected ink stream 114' has not exceeded the Rayleigh instability limit. This portion of the deflected ink stream 114' where the flow of ink 107 is stable ("stable portion") falls approximately within the dispenser-fiber distance DDF. Said differently, in an example the dispenser-fiber distance DDF is selected such that the fiber 50 is contacted by the stable flow portion of the deflected ink stream 114'.

The precise operating parameters of the ink stream deflection device 290 depend on the type (diameter, velocity, viscosity, etc.) of the ink stream 114, the density of the gas 256, the size of the nozzle 284, desired deflection time $t_D$, desired immersion time $t_I$, etc. The amount of gas jet pressure $P_J$ for achieving a select amount of ink stream deflection for intersecting the fiber path FP while ensuring a stable flow portion of the deflected ink stream 114' can be readily established empirically by generating select amounts of the gas jet pressure for a given type of ink streams 114 and measuring the amount of deflection from the original ink stream path ISP. In one example, the nozzle diameter ND can be in the range from 100 microns to 500 microns, the gas jet pressure $P_J$ can be in the range from 1 psi to 12 psi, and the ink stream 114 diameter DS is in the range from 100 microns to 500 microns.

Figure 2D:
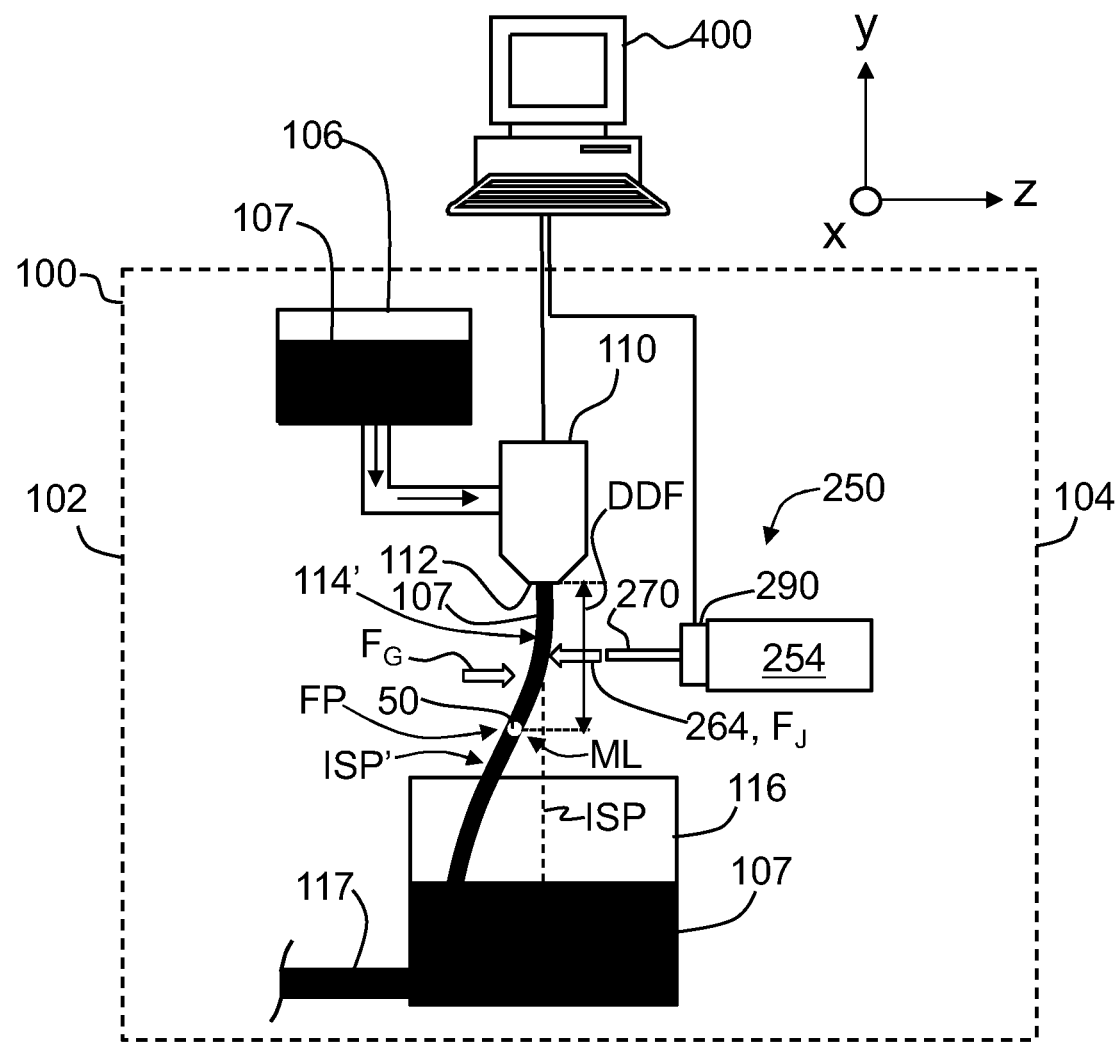
FIG. 2D is a view of an example marking unit looking in the x-direction and showing the deflection of the ink stream in the −z direction and into the fiber path by the gas jet of the flow control device.

FIG. 2D is similar to FIG. 1C and looks in the −x direction so that the fiber 50 is seen in cross-section. With reference to FIGS. 2C and 2D, the force $F_J$ of the gas jet 264 deflects the ink stream 114 from its original ink stream path ISP to the new (deflected) ink stream path ISP', which intersects the fiber path FP and thus the fiber 50 moving along the fiber path. In an example, the ink 107 from the deflected ink stream 114' is still collected by the container 116. While FIG. 2D shows the deflected ink stream 114' remaining intact all the way into the container 116, in other examples the deflected ink stream 114' need only remain substantially intact for the portion of the deflected ink stream that contacts the fiber 50, as explained above. Thus, in other examples, the deflected ink stream 114' can become unstable for the portion of the deflected ink stream downstream of the fiber 50.

Figure 2E:
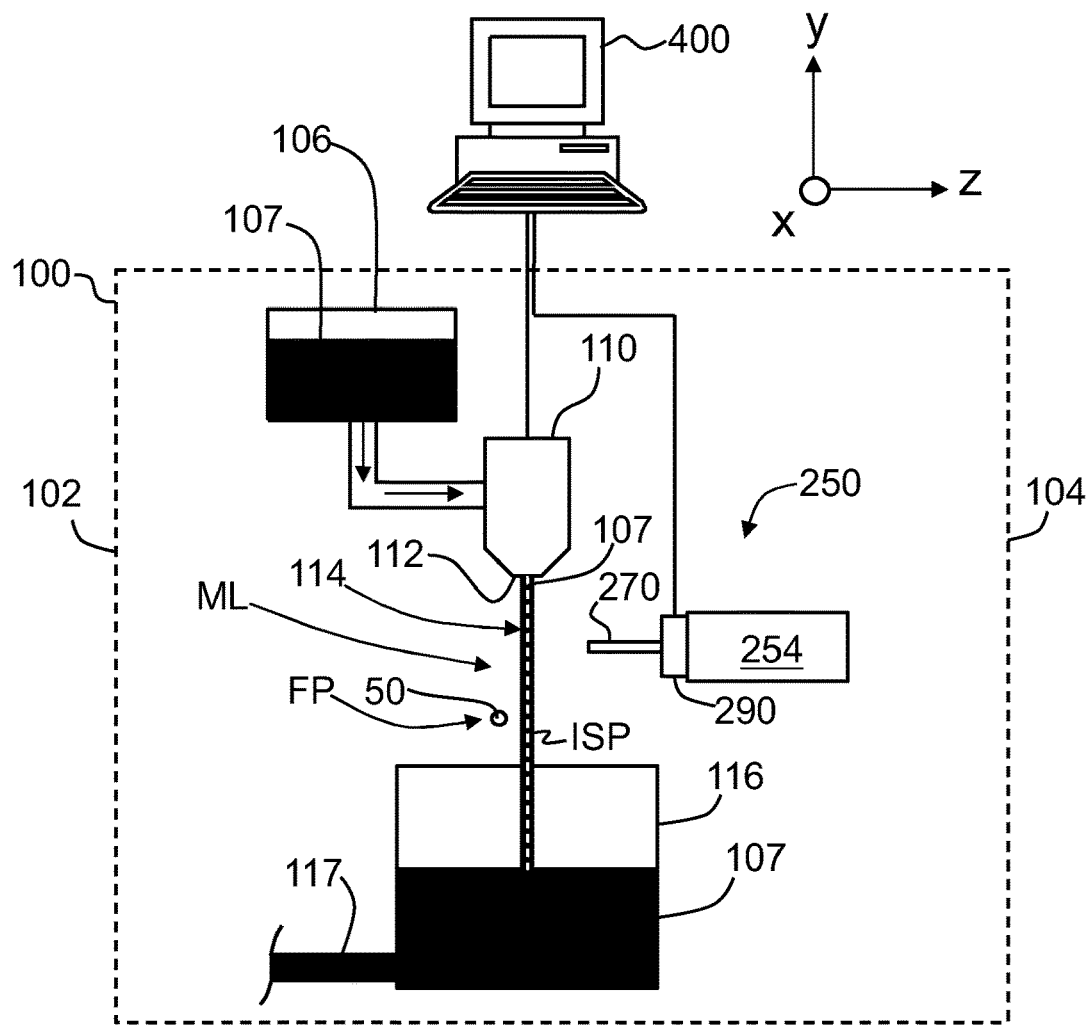
FIG. 2E is similar to FIG. 2D but shows the ink stream deflection device in the off state so that the ink stream flows along its original undeflected ink stream path spaced apart from the fiber path.

After a select period of time based on the type of mark(s) 60 being formed on the fiber 50, the controller 400 puts the flow control device 290 in an off state, which in one example terminates the gas jet 264 and in other examples prevents the gas jet from reaching the ink stream 114. The removal of the deflection force $F_J$ provided by the gas jet 264 allows the gravitation force $F_G$ on the deflected ink stream 114' to return from the deflected ink stream path ISP' to the original ink stream path ISP, as shown in FIG. 2E.

Figure 3A:
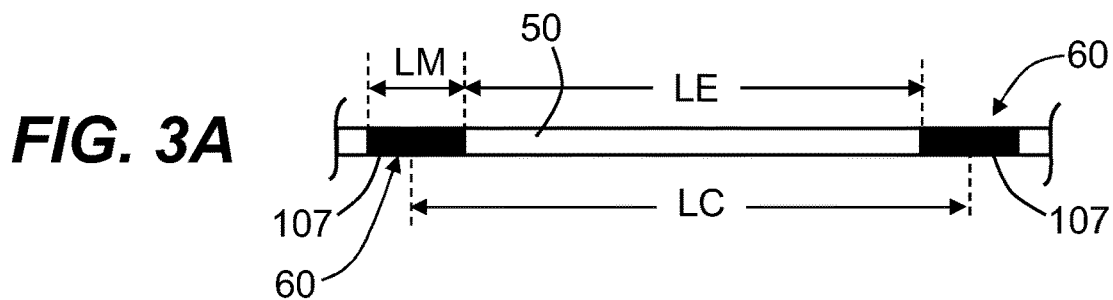
FIG. 3A is a close-up view of a section of the marked optical fiber showing two example spaced apart marks, the axial mark lengths LM, the center-to-center mark spacing LC and the edge-to-edge mark spacing LE.

The ink stream deflection process includes a deflection time $t_D$ over which the ink stream 114 is deflected from and returns to its original ink stream path ISP, and an immersion time $t_I$ over which the fiber 50 intersects the deflected ink stream 114'. This creates a mark 60 on the fiber 50 whose axial length LM is determined by the immersion time $t_I$ and the fiber speed SF, as shown in FIG. 3A. The ink 107 from the deflected ink stream 114' deposits on the fiber outer surface 56 every time the fiber 50 resides at least partially within the deflected ink stream, thereby forming spaced apart marks 60, also as shown in FIG. 3A. Adjacent marks 60 have a center-to-center spacing of LC and an edge-to-edge spacing LE.

Figure 3B:
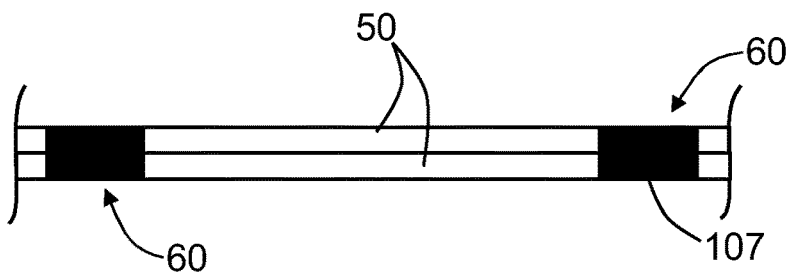
FIG. 3B is similar to FIG. 3A and illustrates an embodiment where multiple (e.g., two or more) fibers 50 are marked by combining the two or more fibers and conveying them over the fiber path FP.

FIG. 3B is similar to FIG. 3A and illustrates an embodiment where multiple (e.g., two or more) fibers 50 are marked by combining the two or more the fibers and conveying them over the fiber path FP. In an example, the multiple fibers 50 constitute a fiber bundle.

In an example, the gas jet 264 is intermittent and is turned on and off using the flow control device 290. The turning on and off can comprise gradually increasing the gas pressure $P_J$ in the gas jet 264 and then gradually decreasing the gas pressure in the gas jet so that the deflection of the ink stream 114 is not abrupt. In another example, the gas jet 264 on and off is done quickly so that the deflection of the ink stream 114 occurs quickly or even abruptly. In other examples discussed below, the gas jet 264 is continuous, meaning that it is not turned off when the ink stream 114 is not being deflected. Instead, the gas jet 264 is intermittently directed away from the ink stream 114 using the flow control device 290, as explained below.

When the fiber 50 is fully immersed in the deflected ink stream 114', the marks 60 have the form of rings that run around the entire circumference of the outer surface 56 of the fiber 50. In an example, the ink stream 114 can be deflected so that only a portion of the fiber 50 resides within the deflected ink stream 114'. In this case, the marks 60 only mark a portion of the circumference of the outer surface 56 of the fiber 50.

Figure 4A:
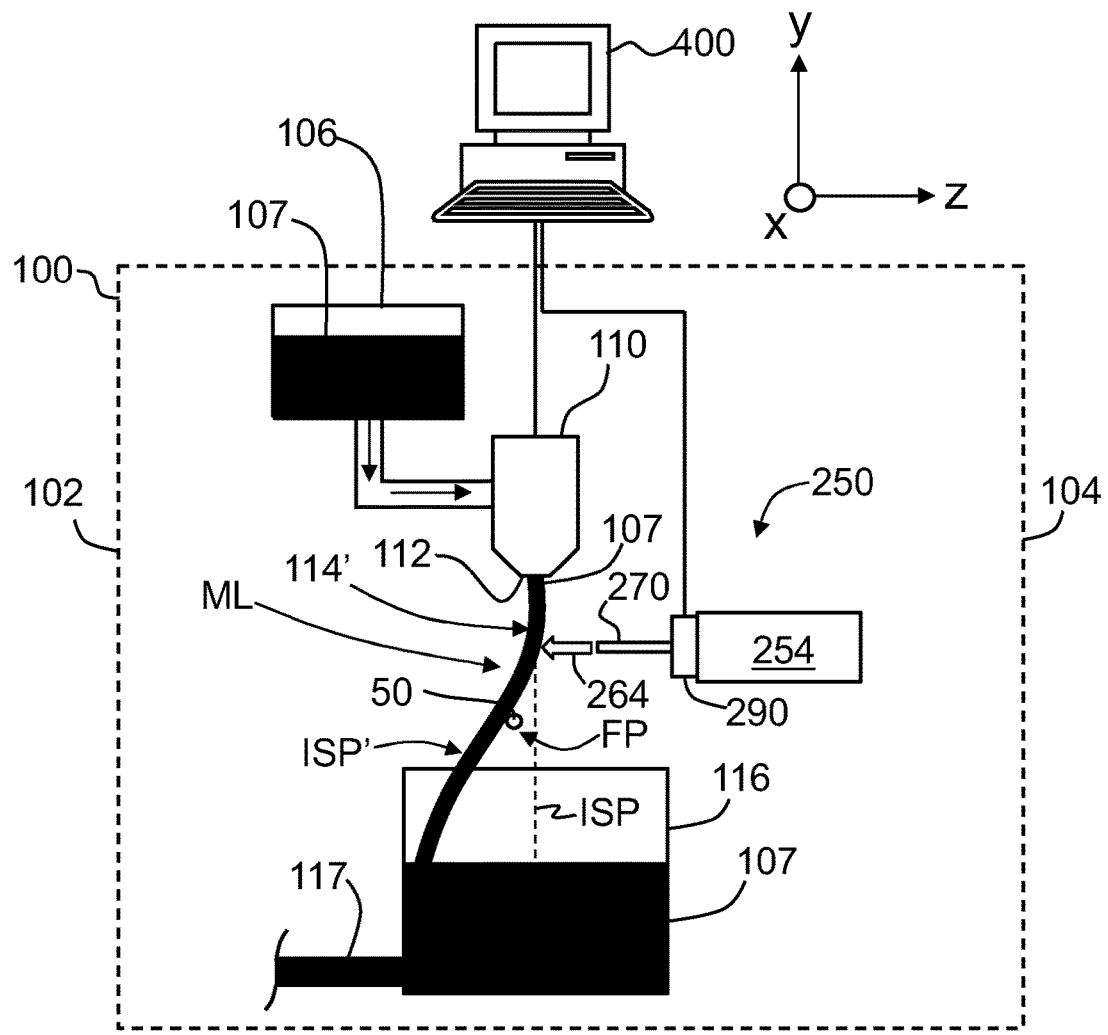
FIG. 4A is similar to FIG. 2D and illustrates an example wherein the ink stream is deflected through the fiber path so that deflected ink stream passes through the fiber path twice in opposite directions.

In another example illustrated in FIG. 4A, the ink stream 114 is deflected by the gas jet 264 in the −z direction so that the deflected ink stream 114' crosses the fiber path FP at the near side of the fiber 50 and resides on the opposite or far side of the fiber 50. The gas jet 264 is then turned off (or deflected, as described below) and the deflected ink stream 114' passes back through the fiber path FP in the +z-direction. In other words, the deflected ink stream 114' crosses the fiber path FP a first time in a first direction and the crosses the fiber a second time in a second direction opposite the first direction.

Figure 4B:
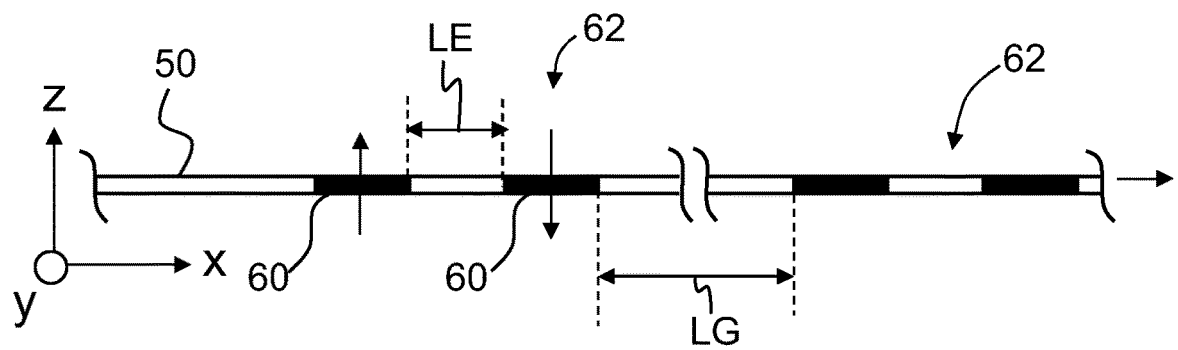
FIG. 4B is a close-up view of an example optical fiber processed using the example of FIG. 3D, wherein the marks are formed in pairs or groupings.

This approach can be used to form two closely spaced marks 60, as shown in FIG. 4B. This marking approach facilitates the formation of pairs of closely spaced marks 60 to form groupings 62 of marks 60, with the groupings spaced apart by a grouping distance LG. In this embodiment, the edge-to-edge spacing LE between adjacent marks 60 in a grouping 62 can be relatively small, e.g., a few millimeters, or on the order of the size (length LM) of a given mark 60.

Figure 5A:
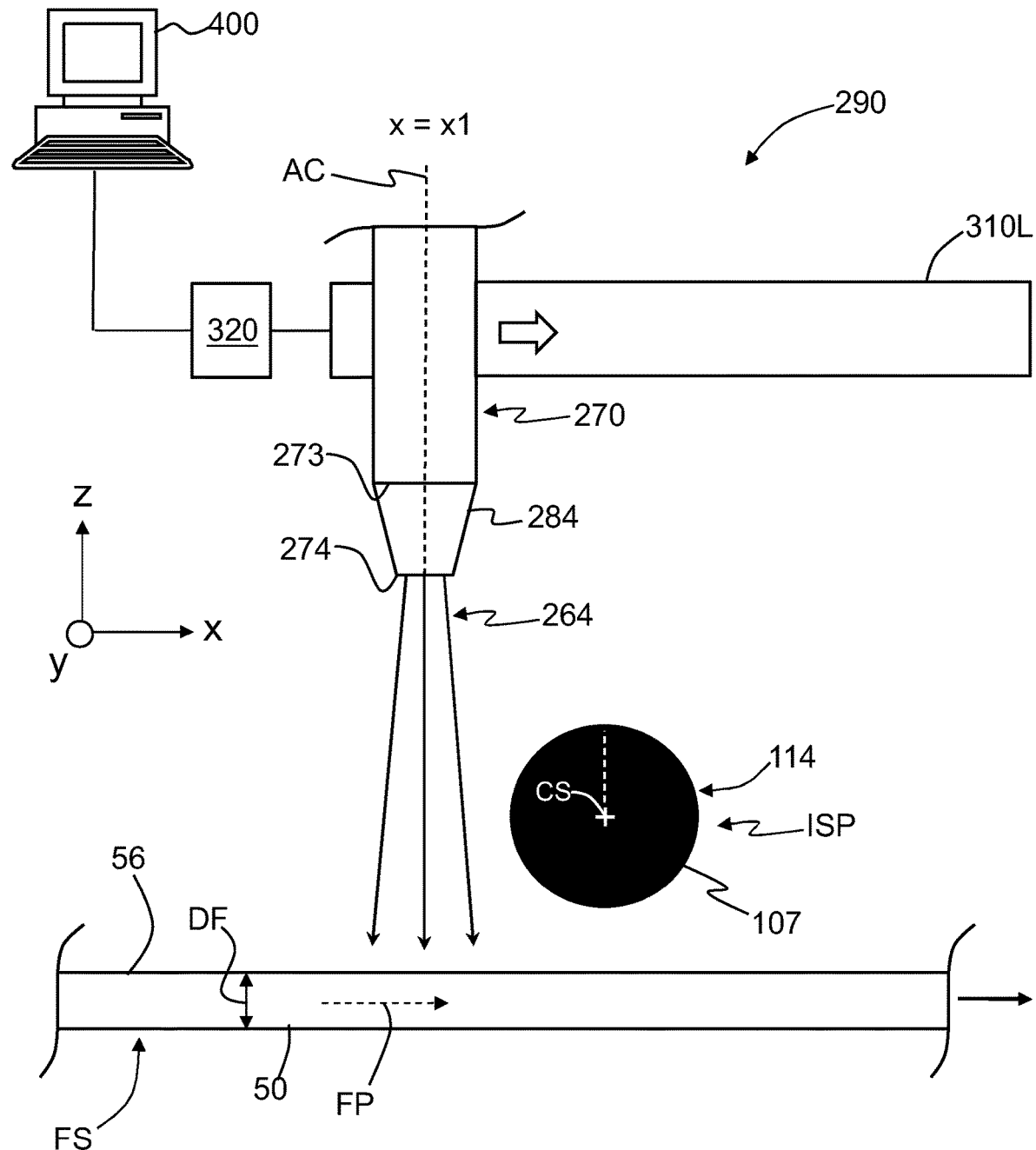
FIGS. 5A through 5C are close-up top-down views of an example flow control device of that includes a linear stage for linearly translating the gas jet relative to the ink stream.
Figure 5B:
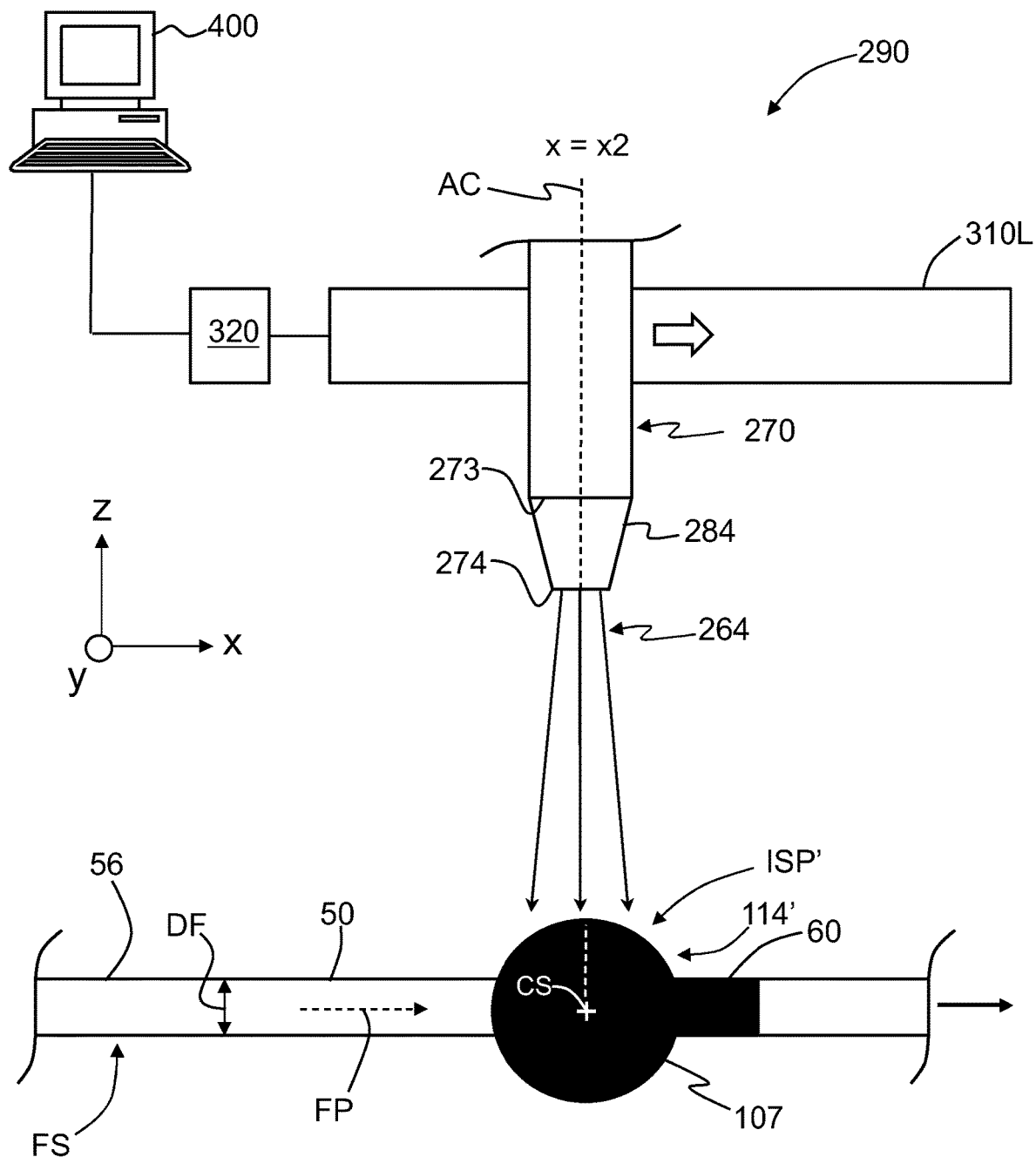
Figure 5C:
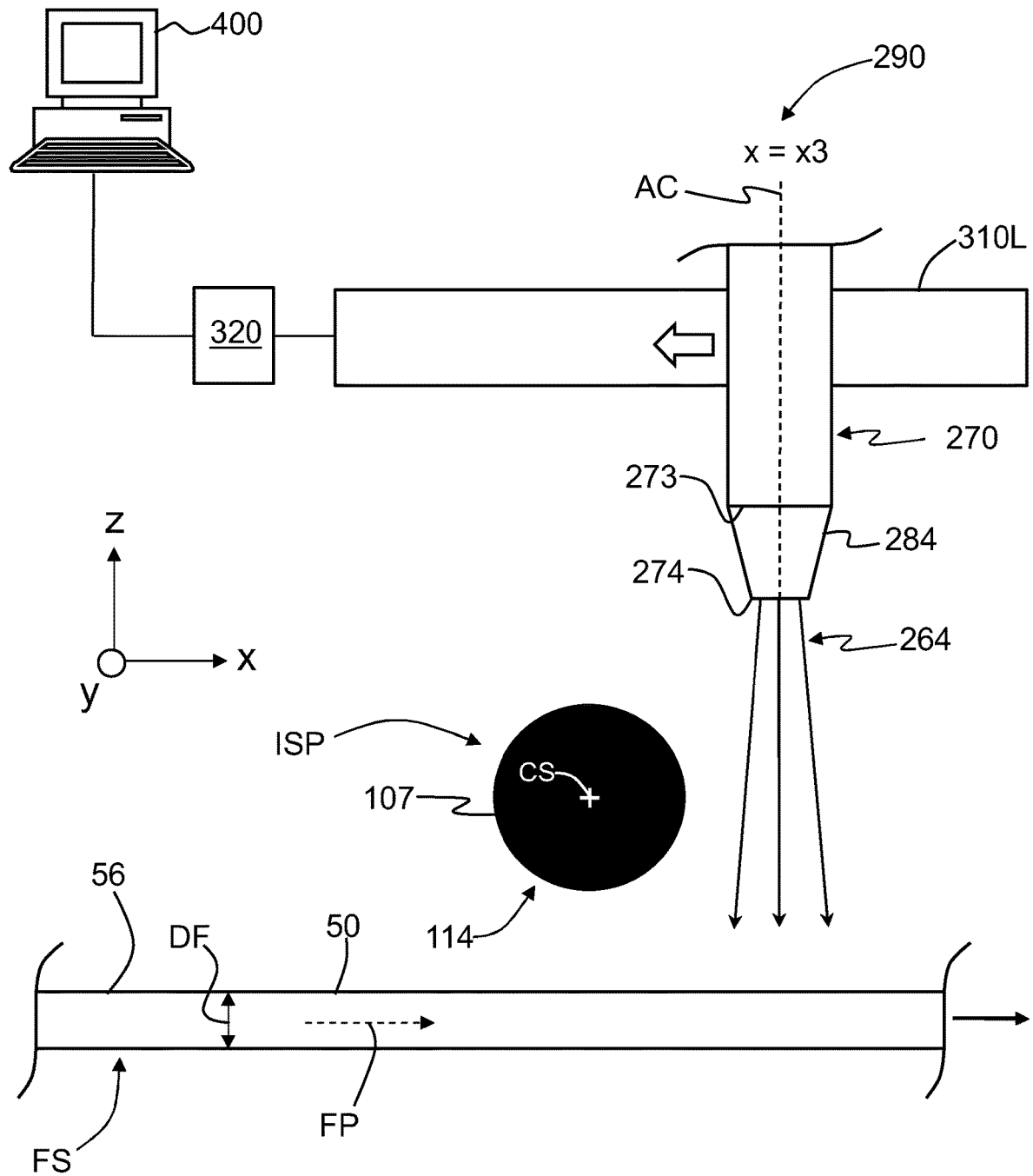

FIGS. 5A through 5C illustrate an example flow control device 290 that controls the direction of the gas jet 264 rather than turning it off and on. The example flow control device 290 shown in FIGS. 5A through 5C comprises a linear translation stage 310L operably connected to a stage controller 320, which in turn is operably connected to and controlled by the controller 400. The gas conduit 270 is mounted to the linear translation stage 310L. An example linear translation stage 310L can comprise a piezoelectric actuator or piezoelectric-based stage. The linear translation stage 310L moves the gas conduit 270 back and forth in the x-direction so that the gas jet 264 translates back and forth in the x-direction.

FIG. 5A shows the gas conduit 270 in a first x-position x1 where the gas jet 264 is directed to the left of the ink stream 114 so that the ink stream remains undeflected. FIG. 5B shows the gas conduit 270 in a second x-position x2 where the gas jet 264 is incident directly upon the ink stream 114, causing it to deflect to form the deflected ink stream 114 with a deflected ink stream path ISP' that intersects the fiber path FP. Note that the movement of the fiber 50 along the fiber path FP while the fiber is immersed in the deflected ink stream 114' initiates the formation of the mark 60 on the fiber.

FIG. 5C shows the gas conduit 270 in a third x-position x3 where the gas jet 264 has moved to the right of the ink stream 114 so that the deflected ink stream 114' of FIG. 5B returns to its original ink stream path ISP. At this point in time, the mark 60 formed on the fiber 50 by the deflected ink stream 114' in FIG. 5B has moved off to the right and so is out of view.

In this embodiment of the flow control device 290, the gas jet 264 can move back and forth in a select manner (e.g., periodic, quasi-periodic, aperiodic, etc.) to define a select configuration of marks 60 on the fiber 50. In an example, the linear motion of the linear translation stage 310L the can stop briefly at the second x-position x2 or slow down when passing through the second x-position to control the deflection time $t_D$ and the immersion time $t_I$.

Figure 6A:
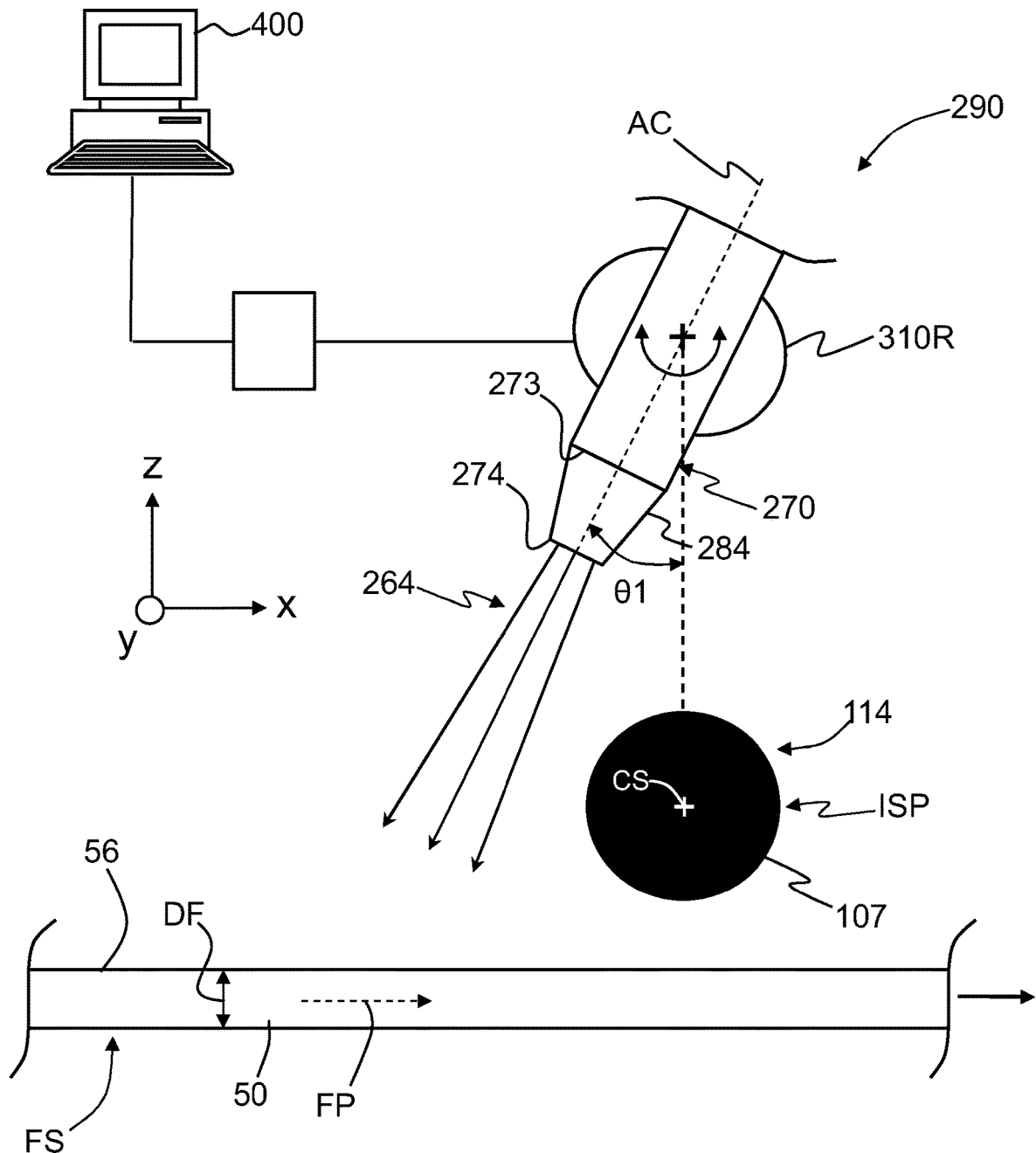
FIGS. 6A through 6C are close-up top-down views of an example flow control device of that includes a rotation stage for rotating the gas jet relative to the ink stream.
Figure 6B:
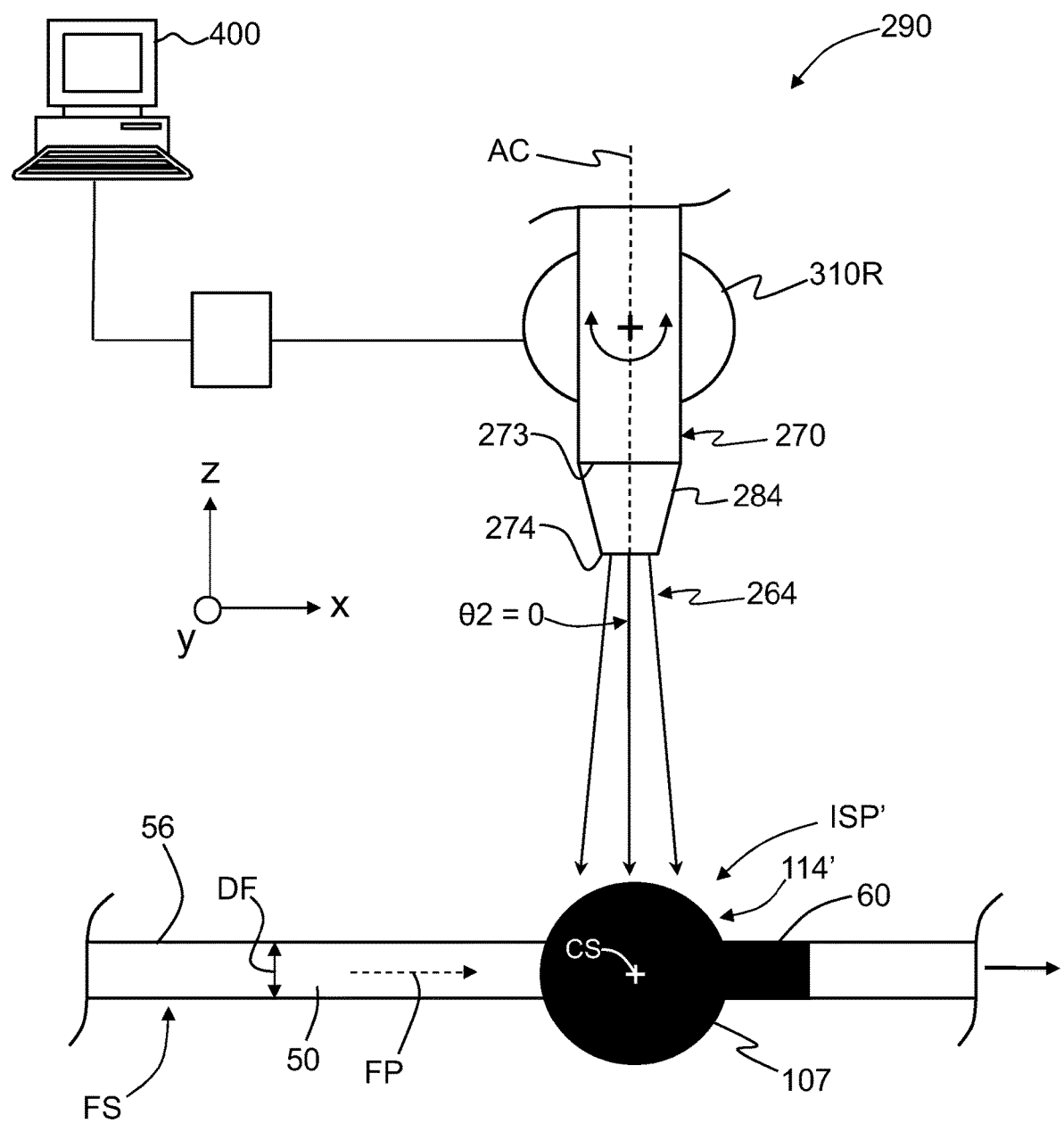
Figure 6C:
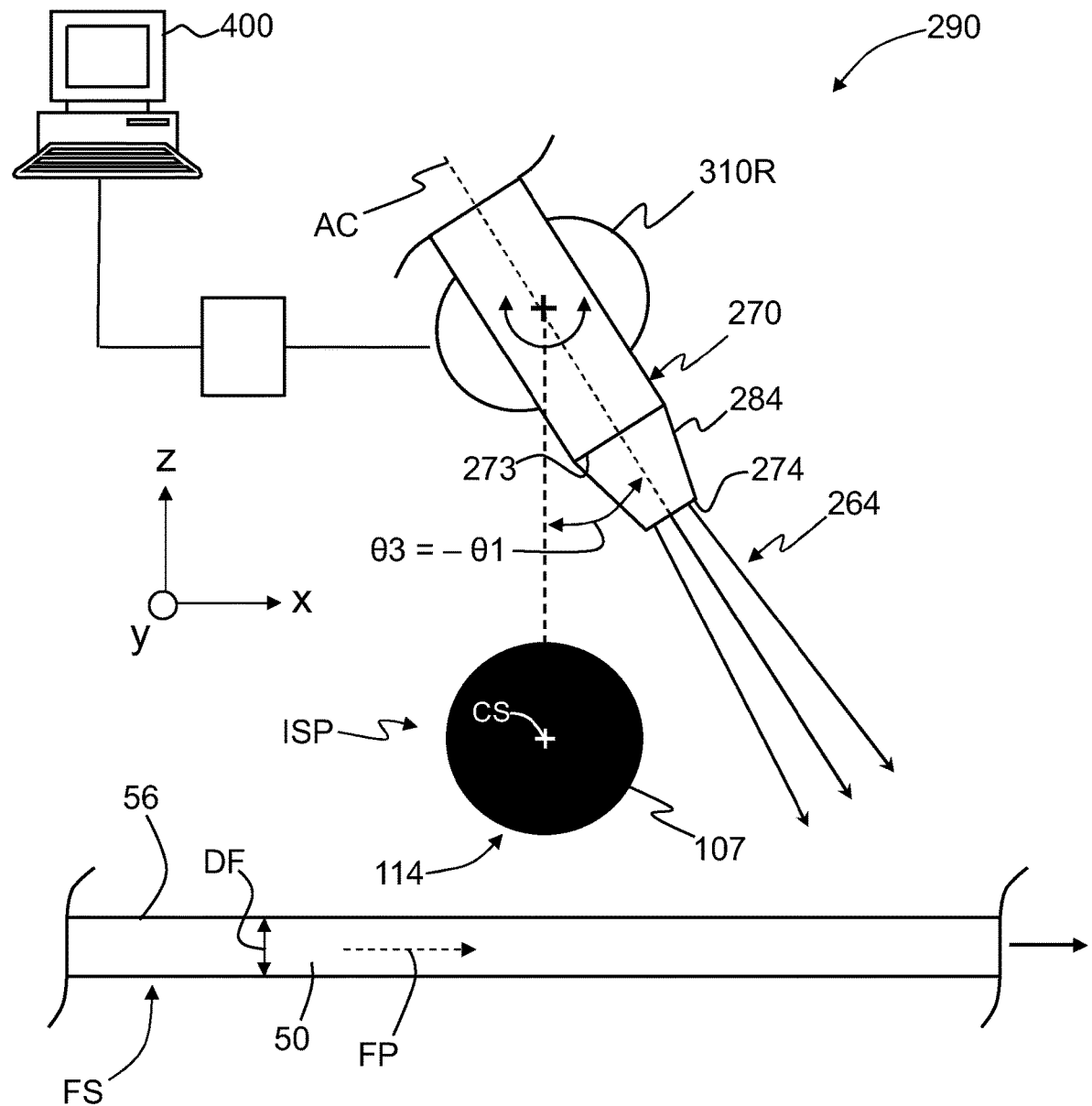

FIGS. 6A through 6C illustrate an example embodiment of the flow control device 290 similar to that of FIGS. 5A through 5C, but wherein the linear translation stage 310L is replaced by a rotation stage 310R.

FIG. 65A shows the gas conduit 270 in a first angular position (rotation angle) θ1 where the gas jet 264 is directed to the left of the ink stream 114 so that the ink stream remains undeflected. FIG. 6B shows the gas conduit 270 in a second angular position θ2=0 where the gas jet 264 is incident directly upon the ink stream 114, causing it to deflect to form the deflected ink stream 114' that travels over the deflected ink stream path ISP' that intersects the fiber path FP. FIG. 6C shows the gas conduit 270 in a third angular position θ3=−θ1 where the gas jet 264 is directed to the right of the ink stream 114 so that the deflected ink stream path ISP' of FIG. 6B has returned to its original ink stream path ISP.

In this embodiment of the flow control device 290, the gas jet 264 can move (e.g., oscillate) back and forth in a select manner (e.g., in a periodic, quasi-periodic, aperiodic, etc.) to define a select configuration of marks 60 on the fiber 50. In an example, the rotational motion can stop briefly at the second angular position θ2 or slow down when passing through the second angular position control the deflection time $t_D$ and the immersion time $t_I$.

Figure 7A:
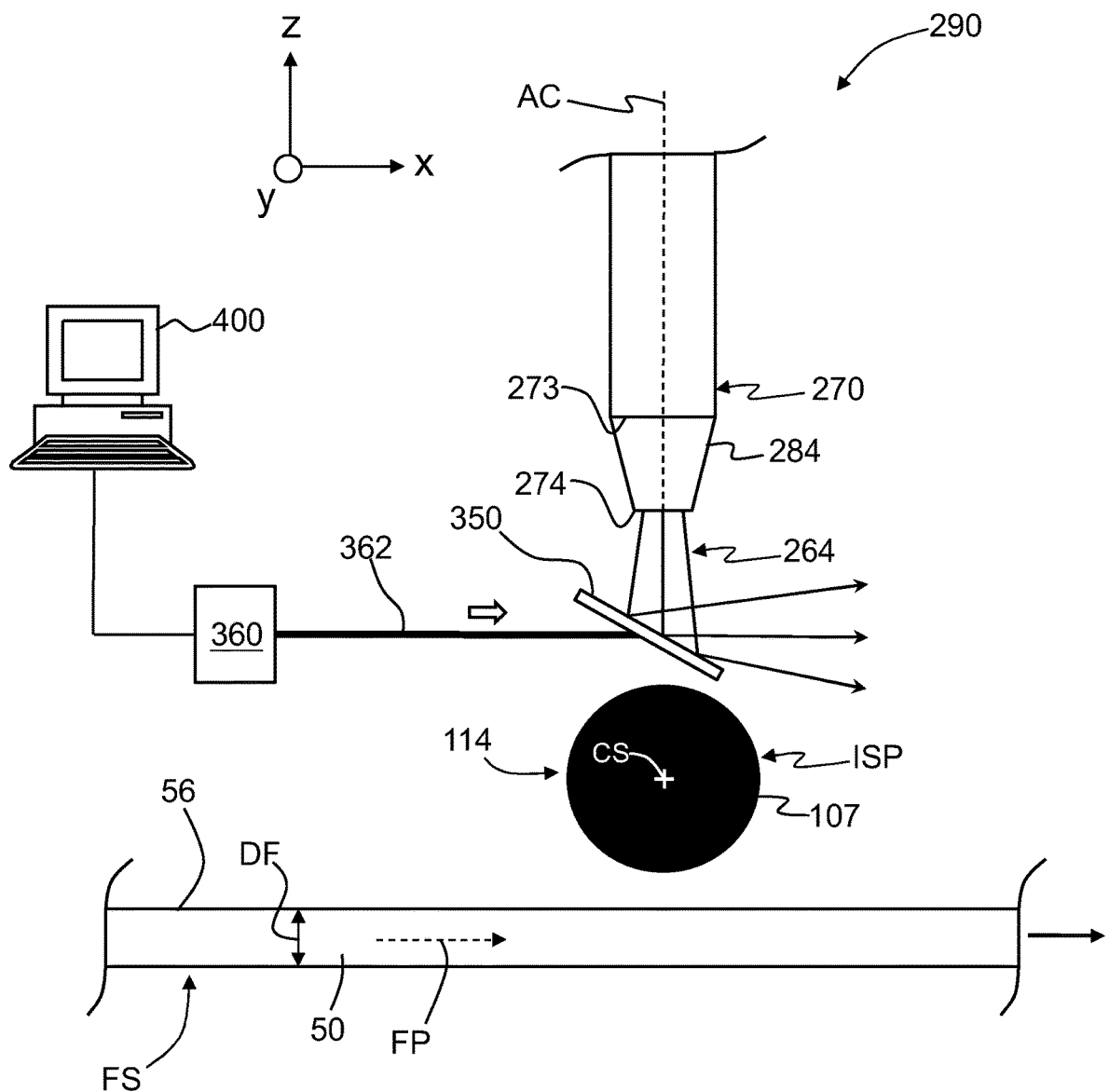
FIGS. 7A through 7C are close-up top-down views of an example flow control device of that includes a blocking member that can be inserted into and removed from the path of the gas jet to control path of the gas jet relative to the ink stream.
Figure 7B:
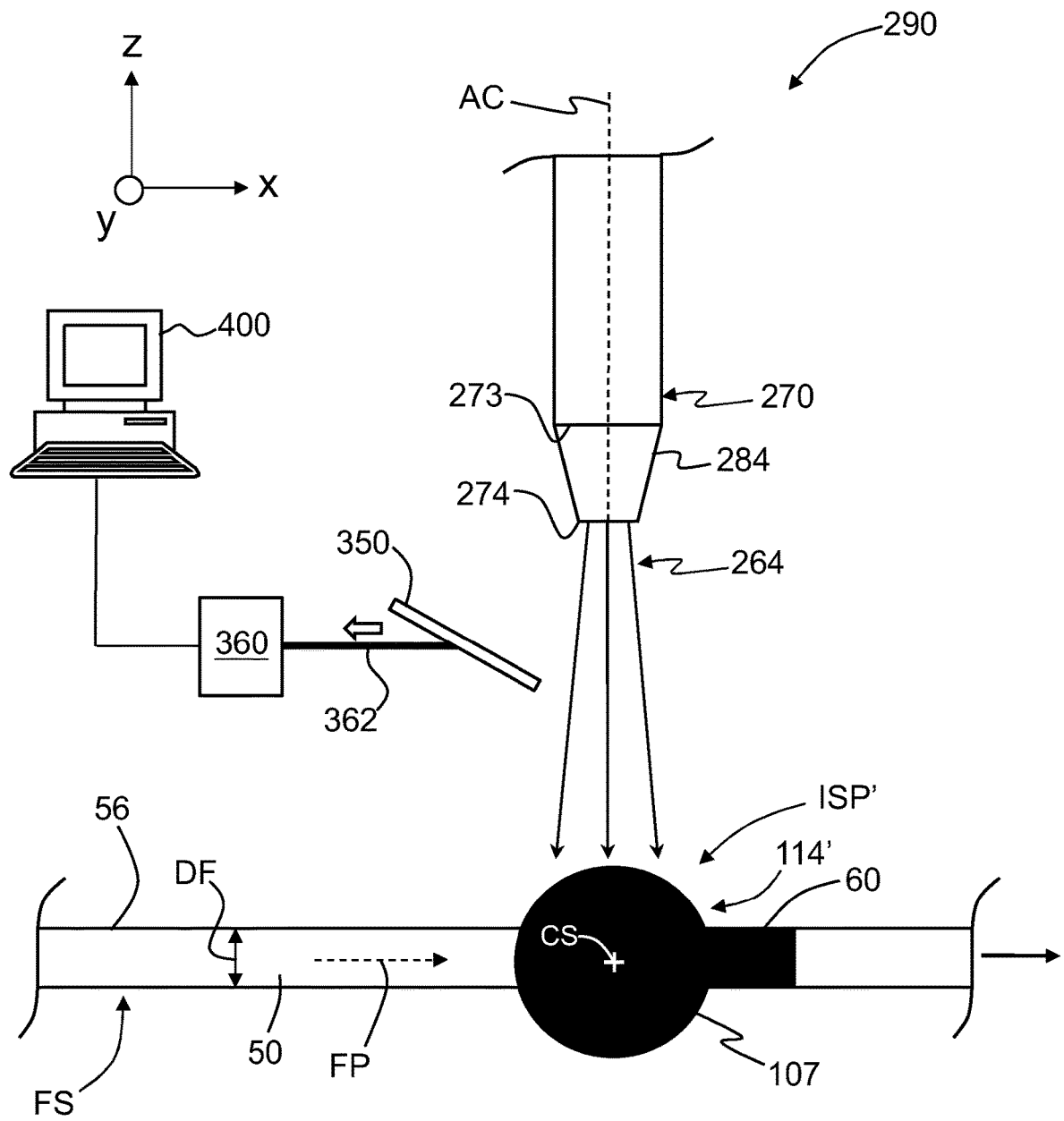
Figure 7C:
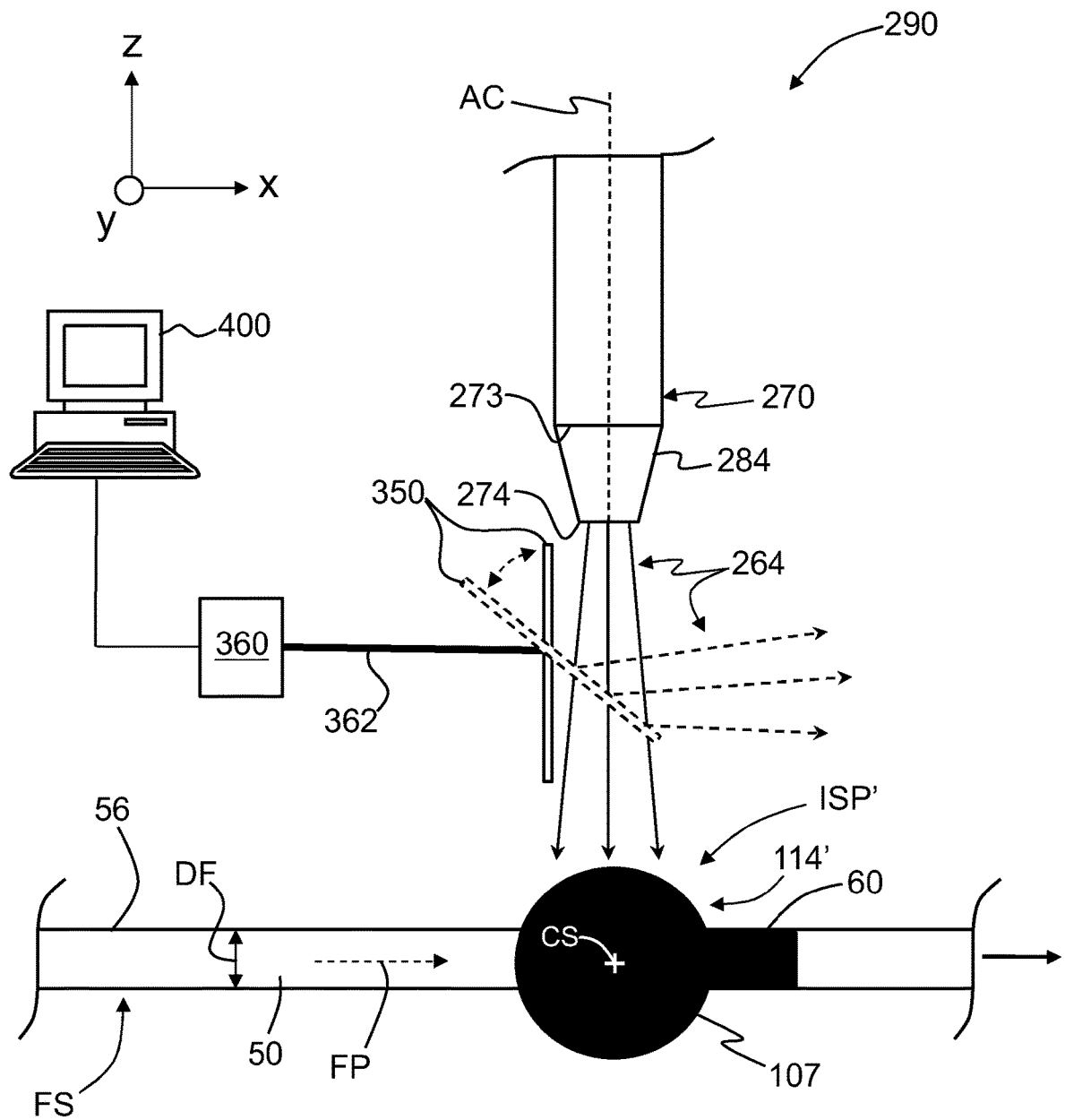

FIGS. 7A through 7C illustrate another example embodiment of the flow control device 290 that operates to block the gas jet 264 instead of turning it on and off. The example flow control device 290 includes a movable blocking member 350 controlled by a member controller 360. In an example, the member controller is mechanically connected to the blocking member 350 with a mechanical connector 362, such as a rod. FIG. 7A shows the blocking member 350 inserted into the path of the gas jet 264 to deflect the gas jet so that it is not incident upon the ink stream 114. In an example, the blocking member 350 is inserted at an angle relative to the direction of the gas jet 264 (e.g., relative to the central axis AC of the gas conduit 270) so that the gas jet 264 is directed away at an angle relative to the gas conduit rather than straight back to the gas conduit.

FIG. 7B shows the blocking member 350 removed from the path of the gas jet 264 so that the gas jet is incident upon and deflects the ink stream to form the deflected ink stream 114' having a deflected ink stream path ISP' that intersects the fiber path FP of the fiber 50. In an example, the movement of the blocking member 350 is back and forth along the x-direction as shown. This can be accomplished by the member controller 360 and mechanical connector 362 comprising a linear actuator or linear motor system.

FIG. 7C is similar to FIG. 7B and shows an example where the blocking member 350 is rotated by the mechanical connector 362 into and out of the path of the gas jet 264 rather than being linearly translated.

Figure 8A:
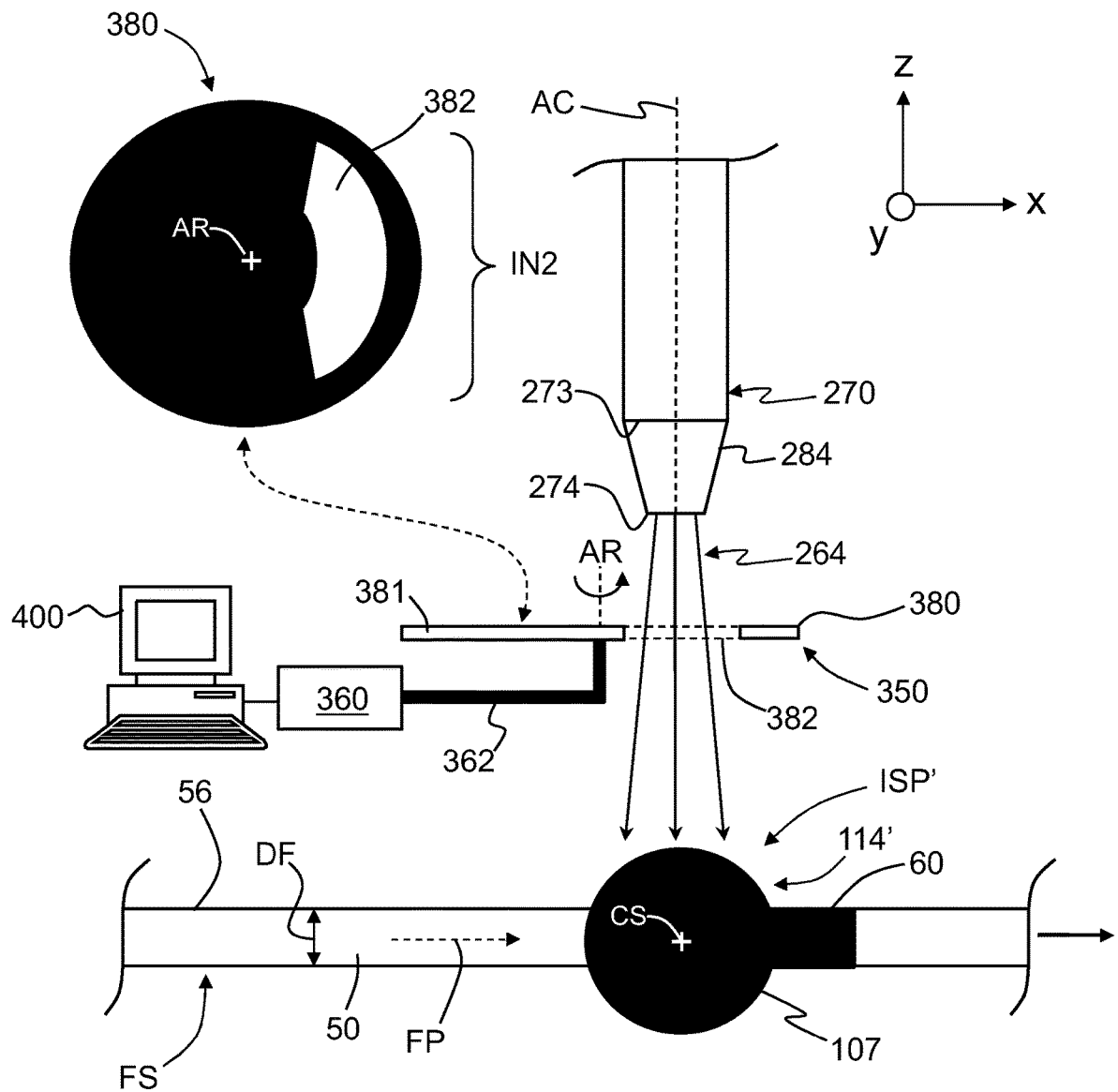
FIGS. 8A through 8B are close-up top-down views of an example flow control device of that includes a blocking member in the form of a rotating disk having an off-axis aperture that can be rotated into and out of the path of the gas jet.

FIGS. 8A and 8C are close-up views of an example flow control device 290 wherein the blocking member 350 comprises a disk 380 having a body 381 and an off-axis aperture 382 formed in the body. An example disk 380 and off-axis aperture 382 is shown in the close-up inset IN2 of FIG. 8A. The example off-axis aperture 382 has an arcuate shape by way of illustration and other shaped apertures can be effectively employed. The disk 380 can also have multiple off-axis apertures 382 and the one annular off-axis aperture is shown by way of example. The member controller 360 operably engages the disk 380 via the mechanical connector 362 (e.g., drive shaft) so that the disk rotates around a rotation axis AR, which is offset relative to the central axis AC of the gas conduit 270.

Figure 8B:
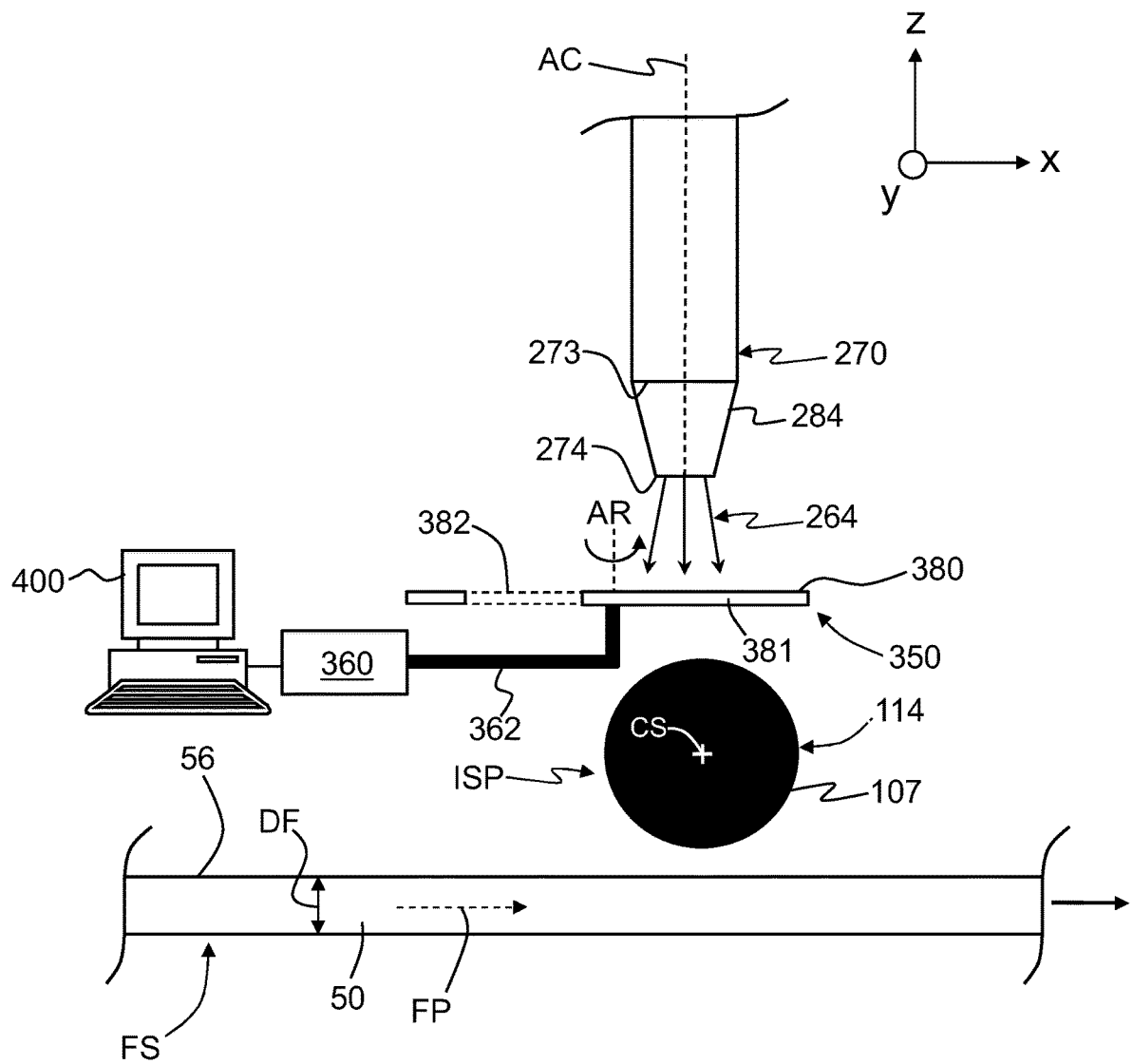

FIG. 8A shows the disk 380 in a first rotational position with the off-axis aperture 382 aligned with the central axis AC of the gas conduit 270 so that that gas jet 264 passes through the off-axis aperture and is incident upon the ink stream 114, which causes the ink stream to deflect and form the deflected ink stream 114' that travels over the deflected ink stream path ISP'. FIG. 8B shows the disk 380 in a second rotational position where the disk has rotated so that the off-axis aperture 382 is on the other side of the rotation axis AR and thus removed from the path of the gas jet 264. In this position, the gas jet 264 is incident upon the body 381 of the disk and is thus prevented from reaching the ink stream 114. In an example, the rotation axis AR of the disk 380 can be angled relative to the central axis AC of the gas conduit so that the gas jet 264 is deflected at an angle away from the gas conduit when blocked by the disk 380.

Apparatus Set Up and Method of Operation for Marking

As noted above, the apparatus 10 includes at least one marking unit 100. Thus, in other embodiments, the apparatus 10 can include multiple marking units 100 arranged so that marks 60 are formed from the multiple marking units prior to the marks being processed as described above. The use of multiple marking units 100 can be used to form a higher number density of marks 60 and to form select groupings 62 of marks. The use of multiple marking units 100 also allows for the marks 60 to have different colors by using different colored ink streams 114 for the different marking units 100.

Furthermore, a marking unit 100 can be disposed within or downstream of the overcoating system 100 to form marks 60 on the protective overcoat 180 rather than or in addition to marks residing beneath the protective overcoat. This approach can be useful where the protective overcoat is colored and where the marks 60 can be more visible on the outer surface of the protective overcoat 180 rather than underneath the protective overcoat.

It will be understood that the various design parameters of apparatus 100, such as the number of marking units 100, the particular configuration of the ink stream deflection device can be selected to form marks 60 having a variety of sizes, shapes, spacings, groupings, patterns and colors.

With reference again to FIG. 1A, as part of the setting up of apparatus 10, the storage reel 30 with the unmarked fiber 50 is loaded into the payout module 20. The unmarked fiber 50 is then fed through the nearby drive pulley 36D.

With reference again also to FIG. 1A, the fiber 50 is led over the fiber path FP through the marking unit 100 and past the ink stream deflection device 250, and then to the position sensor 120 and through the interior 138 of the dryer unit 130. The fiber 50 is then led around the three guide pulleys 36G that reside downstream of the dryer unit 130. The fiber 50 is then led under the mark counter 150, through the overcoat applicator 170 and then through the curing system 190. The fiber 50 is then led around the drive pulley 36D of the take-up module 220 and onto the take-up reel 230.

Once the fiber 50 is set up to travel over the fiber path FP through the apparatus 10 and its various components as described above, the controller 400 activates the drive pulleys 36D of the payout module 20 and the take-up module 220 to start moving the fiber 50 along the fiber path at a select speed SF.

Once the fiber 50 ramps up to the select fiber speed SF, the marking unit 100 and the ink stream deflection device 250 are activated (e.g., via the controller 400). With reference to FIG. 2C, this includes causing the ink dispenser 110 to dispense from its output end 112 the ink 107 in the form of the ink stream 114. As the fiber 50 moves along the fiber path FP, the ink stream deflection device 250 acts to periodically move (deflect) the ink stream path ISP of the ink stream 114 into the fiber path FP of the fiber 50 as described above so that spaced apart marks 60 are formed on the fiber.

In an example, the edge-to-edge spacing LE between adjacent marks 60 can be in the range between 5 mm and 500 mm, or 10 mm and 500 mm or 25 mm and 500 mm or 50 mm to 250 mm, with LE=250 mm being suitable for fibers used in submarine cables. In an example, the number density N of the marks 60 can be between 1 and 40 per meter, or between 2 and 20 per meter, or between 3 and 10 per meter, or between 3 and 7 per meter.

Once the ink 107 is deposited on the unmarked fiber 50 to form the mark 60, the ink needs to be dried so that the mark 60 becomes substantially permanent. This is accomplished by passing the marked fiber 50 exiting the marking unit 100 at the output end 104 through the interior 138 of the dryer tube 136 of the dryer unit 130. In one example, the dryer unit 130 is configured to flow hot air through the interior 138 of the dryer tube 136 to dry the ink 107 that forms the mark 60. In a particular example, the hot air flashes off substantially all of solvent (e.g., MEK) from the ink 107 to leave pigment on the outer surface 56. Evaporation of the solvent improves the adhesion between the mark 60 and the outer surface 56 of the fiber 50. The dryer unit 130 is not limited to an air-based dryer and in other examples the drying can be accomplished using other means, such as microwaves, infrared radiation, ultraviolet radiation, convected hot air, etc.

With continuing reference to FIG. 1A, the marked fiber 50 exits the output end 134 of the dryer unit 130 and then passes by the marking counter 150, which counts the number of marks, e.g., as a measured number density $N_M$. The measured number density $N_M$ from the mark counter 150 is sent to the controller 400 and compared to the expected (selected) number density N. The mark counter 150 is used for quality control, i.e., to ensure that the correct number density N of marks 60 is being formed, to spot any missing marks 60, to find extra marks, and to identify incorrectly formed marks.

FIG. 9 is a close-up view of the overcoating system 199 of FIG. 1A. With reference now to FIG. 9 and FIG. 1A, the marked fiber 50 continues to the overcoat applicator 170 of the overcoating system 199. FIG. 10A is a cross-sectional view of the marked fiber 50 taken at one of the marks 60 at the location a-a in FIG. 9 and illustrates an example ring-type mark 60 that makes a complete circuit of the optical fiber circumference (closed ring mark).

The overcoat applicator 170 deposits an overcoat material 176 on the outer surface 56 of the marked fiber 50 to form a covered or overcoated fiber. The overcoat material 176 forms a protective overcoat 180 over the entire outer surface 56, including any marks 60 thereon. In an example, the overcoat applicator 170 comprises a coating tube 178 with an interior 179 through with the fiber path FP passes. The overcoat material 176 is provided to the interior 179 so that the fiber 50 passes through the overcoat material 176, which is the substantially uniformly applied around the circumference (or portion thereof) of the outer surface 56 of the marked fiber.

In an example, the overcoat material 176 is at least semi-transparent so that the marks 60 are visible through the overcoat 180. Further in an example, the overcoat material 176 can be colored (e.g., via a pigment) to define a colored overcoat 180, e.g., yellow for submarine fibers 50. In an example, the overcoat material 176 is light-curable, e.g., by ultraviolet (UV) radiation. In an example, the overcoat material 176 comprises a UV-curable acrylate. The main purpose of the overcoat 180 is to protect the marks 60 from external wear, such as from handling by field personnel, abrasion or rubbing against adjacent fibers or cable surfaces, etc.

Figure 11:
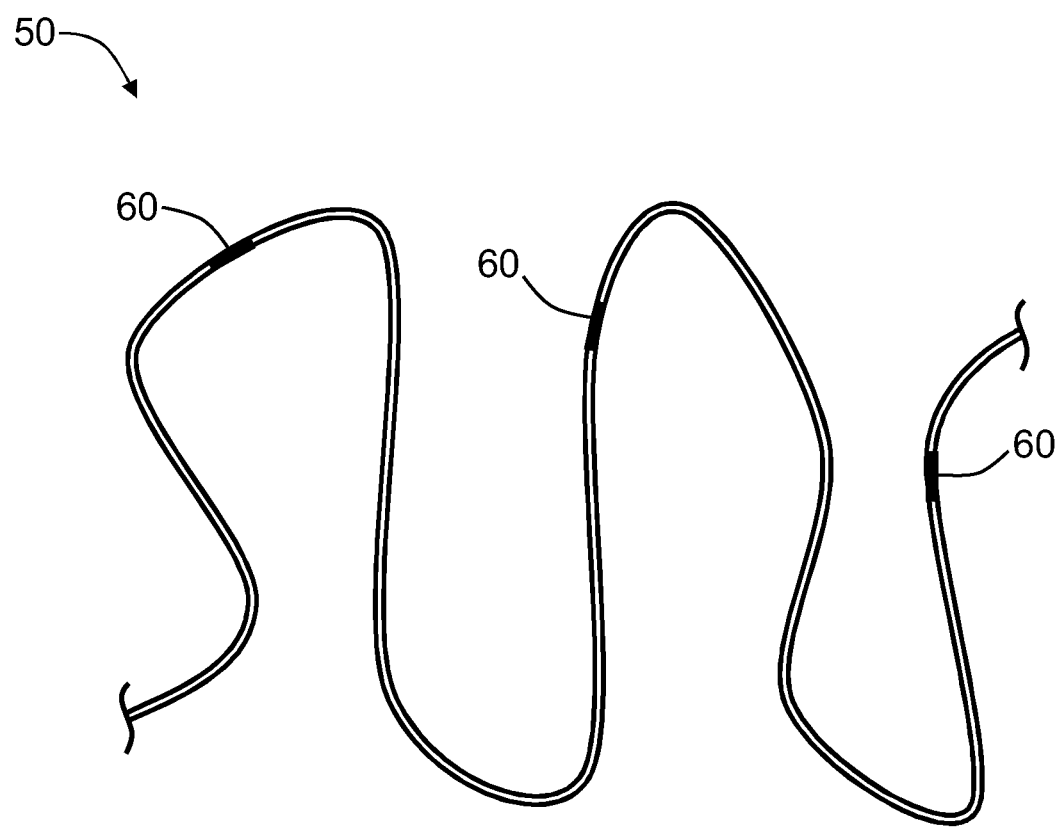
FIG. 11 is a schematic diagram of a section of the marked and overcoated optical fiber showing the spaced-apart marks formed using the apparatus and methods disclosed herein.

With continuing reference to FIG. 1A and to FIG. 9, upon exit from overcoat applicator 170, the fiber 50 is passed through the curing system 190 to cure the overcoat material 176. In an example, the curing system 190 is light based and is configured to generate actinic light 196 (e.g., UV radiation) that irradiates the overcoat material 176 and cures it to form overcoat 180. In an example, the curing system 190 has an interior 195 and the actinic light 196 is incident upon the overcoat material 176 from substantially 360°. FIG. 10B is similar to FIG. 10A and shows the marked fiber 50 with the protective overcoat 180. FIG. 11 is a schematic diagram of a section of marked fiber 50 (or marked and overcoated fiber 50) showing spaced apart marks 60 formed using the apparatus and methods described herein.

Aspect 1 of the description is:
A method of marking an optical fiber having an outer surface, comprising:
forming from ink an ink stream that moves over an ink stream path; moving an optical fiber over a fiber path that resides adjacent and spaced apart from the ink stream; and
directing a gas jet to be incident upon the ink stream to form a deflected ink stream that moves over a deflected ink stream path, the optical fiber at least partially entering the deflected ink stream.

Aspect 2 of the description is:
The method according to Aspect 1, wherein the directing the gas jet comprises:
intermittently directing the gas jet to be incident upon the ink stream to form an intermittently deflected ink stream, at least a portion of the optical fiber intermittently entering the intermittently deflected ink stream.

Aspect 3 of the description is:
The method according to Aspect 1 or 2, wherein the fiber path is substantially perpendicular to the ink stream path.

Aspect 4 of the description is:
The method according to any of Aspects 1-3, wherein the optical fiber is fully immersed in the deflected ink stream.

Aspect 5 of the description is:
The method according to any of Aspects 1-4, wherein the optical fiber at least partially entering the ink stream comprises the deflected ink stream passing over the fiber path a first time in a first direction and then passing over the fiber path a second time in a second direction opposite the first direction.

Aspect 6 of the description is:
The method according to any of Aspects 1-5, wherein the gas jet comprises air.

Aspect 7 of the description is:
The method according to Aspect 2, wherein the intermittently deflected ink stream comprises either a periodically deflected ink stream or a quasi-periodically deflected ink stream.

Aspect 8 of the description is:
The method according to Aspect 2 or 7, wherein the intermittently directing comprises intermittently turning the gas jet on and off.

Aspect 9 of the description is:
The method according to any of Aspects 2, 7 or 8, wherein the intermittently directing the gas jet comprises directing the gas jet away from the ink stream.

Aspect 10 of the description is:
The method according to any of Aspects 2 or 7-9, wherein the intermittently directing the gas jet comprises intermittently blocking the gas jet.

Aspect 11 of the description is:
The method according to any of Aspects 2 or 7-10, wherein the intermittently deflected ink stream forms spaced apart marks on the optical fiber, the marks having an axial length between 1 mm and 10 mm.

Aspect 12 of the description is:
The method according to Aspect 11, wherein the marks have a center-to-center spacing of between 5 mm and 500 mm.

Aspect 13 of the description is:
The method according to Aspect 11 or 12, wherein the marks are formed as wet marks, and the method further comprising drying the wet marks to form dry marks.

Aspect 14 of the description is:
The method according to Aspect 13, further comprising forming a protective overcoat over the outer surface of the optical fiber and the dry marks.

Aspect 15 of the description is:
The method according to any of Aspects 1-14, wherein the moving of the optical fiber over the fiber path includes moving the optical fiber at a line speed of at least 10 meters per second.

Aspect 16 of the description is:
The method according to Aspect 15, wherein the line speed is at least 50 meters per second.

Aspect 17 of the description is:
The method according to any of Aspects 1-16, wherein the ink stream has a diameter DS in the range $20 \ \mu m \leq DS \leq 5000 \ \mu m$.

Aspect 18 of the description is:
The method according to any of Aspects 1-17, wherein the optical fiber has a diameter DF and the ink stream has a diameter DS in the range $(0.5) \cdot DF \leq DS \leq 10 \cdot DF$.

Aspect 19 of the description is:
The method according to Aspect 18, wherein $DF \leq DS \leq 5 \cdot DF$.

Aspect 20 of the description is:
A method of marking an optical fiber, comprising:
causing at least one optical fiber to move over a fiber path that resides adjacent and spaced apart from an ink stream comprising ink, wherein the at least one moving optical fiber has an outer surface;
intermittently deflecting the ink stream with a gas jet made intermittently incident upon the ink stream to form an intermittently deflected ink stream, at least a portion of the moving optical fiber intermittently entering the intermittently deflected ink stream forming wet marks on the outer surface of the at least one moving optical fiber;
drying the wet marks at a drying location to form dried marks; and
applying a substantially transparent protective coating over the dried marks and the outer surface of the at least one moving optical fiber, wherein the dried marks are visible through the substantially transparent protective coating.

Aspect 21 of the description is:

The method according to Aspect 20, wherein the intermittently deflecting of the ink stream comprises either: a) turning on and off the gas jet; b) intermittently deflecting the gas jet; or c) intermittently blocking the gas jet.

Aspect 22 of the description is:

The method according to Aspect 20 or 21, wherein the fiber path is substantially perpendicular to the ink stream.

Aspect 23 of the description is:

The method according to any of Aspects 20-22, wherein the dried marks have an axial length between 1 mm and 10 mm and a center-to-center spacing of between 5 mm and 500 mm.

Aspect 24 of the description is:

The method according to any of Aspects 20-23, wherein the dried marks have a select number density in the range of 1 to 40 per meter.

Aspect 25 of the description is:

The method according to Aspect 24, wherein the select number density is in the range of 3 to 10 per meter.

Aspect 26 of the description is:

The method according to any of Aspects 20-25, wherein the ink stream has a diameter DS in the range 20 µm≤DS≤5000 µm.

Aspect 27 of the description is:

The method according to any of Aspects 20-26, wherein the at least one optical fiber consists of a single optical fiber.

Aspect 28 of the description is:

An optical fiber marking apparatus for marking an optical fiber having an outer surface, comprising relative to a fiber path:

a payout module and a take-up module respectively configured to pay out and take up the optical fiber while moving the optical fiber over the fiber path at a fiber speed;

a marking unit disposed downstream of the payout module and at a marking location, the marking unit configured to form an ink stream of ink adjacent and spaced apart from the fiber path; and an ink stream deflection device operably disposed relative to the marking unit, the ink stream deflection device adapted to intermittently deflect the ink stream to form an intermittently deflected ink stream, the intermittently deflected ink stream intersecting the moving optical fiber.

Aspect 29 of the description is:

The optical fiber marking apparatus according to Aspect 28, wherein the ink stream deflection device comprises:

a compressed gas source that contains a compressed gas;

a gas conduit pneumatically connected to the compressed gas sourced and having an output end; and a flow control device operably arranged relative to the compressed gas source and gas conduit to control a flow of the compressed gas from the compressed gas source and through the output end of the gas conduit to form a gas jet that is intermittently incident upon the ink stream to form the intermittently deflected ink stream.

Aspect 30 of the description is:

The optical fiber marking apparatus according to Aspect 29, wherein the flow control device comprises a gas flow valve that can be switched between a closed state and an open state by a control signal.

Aspect 31 of the description is:

The optical fiber marking apparatus according to Aspect 29 or 30, wherein the flow control device comprises a blocking member configured to be intermittently inserted into the gas jet to intermittently prevent the gas jet from being incident upon the ink stream.

Aspect 32 of the description is:

The optical fiber marking apparatus according to Aspect 31, wherein the blocking member comprises a rotatable disk with an off-axis aperture, the rotatable disk arranged so that the gas jet intermittently passes through the off-axis aperture to be incident upon the ink stream.

Aspect 33 of the description is:

The optical fiber marking apparatus according to any of Aspects 29-33, wherein the flow control device comprises a movable stage that supports the gas conduit, wherein the movable stage is movable to intermittently direct the gas jet to be incident upon the ink stream.

Aspect 34 of the description is:

The optical fiber marking apparatus according to Aspect 33, wherein the movable stage comprises a linear translation stage.

Aspect 35 of the description is:

The optical fiber marking apparatus according to Aspect 33 or 34, wherein the movable stage comprises a rotation stage.

Aspect 36 of the description is:

The optical fiber marking apparatus according to any of Aspects 28-35, wherein the fiber path is substantially perpendicular to the ink stream.

Aspect 37 of the description is:

The optical fiber marking apparatus according to any of Aspects 28-36, wherein the ink stream has a diameter DS in the range 20 µm≤DS≤5000 µm.

Aspect 38 of the description is:

The optical fiber marking apparatus according to any of Aspects 28-37, wherein the moving optical fiber has a diameter DF and the ink stream has a diameter DS in the range (0.5)·DF≤DS≤10·DF.

Aspect 39 of the description is:

The optical fiber marking apparatus according to Aspect 38, wherein DF≤DS≤5·DF.

Aspect 40 of the description is:

The optical fiber marking apparatus according to any of Aspects 28-39, wherein the intermittently deflected ink stream forms wet marks on the moving optical fiber, the optical fiber marking apparatus further comprising:

a dryer unit configured to dry the wet marks to form dried marks.

Aspect 41 of the description is:

The optical fiber marking apparatus according Aspect 40, further comprising:

an overcoating system disposed downstream of the dryer unit and configured to coat the dried marks and the outer surface of the optical fiber.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of marking an optical fiber having an outer surface, comprising:

forming from ink a continuous-flow ink steam that moves along an ink steam path from a dispenser to a container uninterrupted by a gap;

moving an optical fiber over a fiber path that resides adjacent to and spaced apart from the continuous-flow ink steam; and directing a gas jet to be incident upon the continuous-flow ink steam to form a deflected ink steam that moves over a deflected ink stream path, the optical fiber at least partially entering the deflected ink stream.

2. The method according to claim 1, wherein the directing the gas jet comprises:

intermittently directing the gas jet to be incident upon the continuous-flow ink stream to form an intermittently deflected ink stream, at least a portion of the optical fiber intermittently entering the intermittently deflected ink stream.

3. The method according to claim 1, wherein the optical fiber at least partially entering the continuous-flow ink stream comprises the deflected ink stream passing over the fiber path a first time in a first direction and then passing over the fiber path a second time in a second direction opposite the first direction.

4. The method according to claim 2, wherein the intermittently directing the gas jet comprises intermittently turning the gas jet on and off.

5. The method according to claim 2, wherein the intermittently directing the gas jet comprises directing the gas jet away from the ink stream.

6. The method according to claim 2, wherein the intermittently directing the gas jet comprises intermittently blocking the gas jet.

7. The method according to claim 2, wherein the intermittently deflected ink stream forms spaced apart marks on the optical fiber, the marks having an axial length between 1 mm and 10 mm.

8. The method according to claim 7, wherein the marks have a center-to-center spacing of between 5 mm and 500 mm.

9. The method according to claim 7, wherein the marks are formed as wet marks, and the method further comprising drying the wet marks to form dry marks.

10. The method according to claim 9, further comprising forming a protective overcoat over the outer surface of the optical fiber and the dry marks.

11. The method according to claim 1, wherein the moving of the optical fiber over the fiber path includes moving the optical fiber at a line speed of at least 10 meters per second.

12. The method according to claim 1, wherein the continuous-flow ink stream has a diameter DS in the range 20 µm≤DS≤5000 µm.

13. The method according to claim 1, wherein the optical fiber has a diameter DF and the ink stream has a diameter DS in the range $(0.5) \cdot DF \leq DS \leq 10 \cdot DF$.

14. A method of marking an optical fiber, comprising:

causing at least one optical fiber to move along a fiber path that resides adjacent and spaced apart from a continuous-flow ink stream comprising ink flowing from a dispenser to a container uninterrupted by a gap, wherein the at least one optical fiber has an outer surface;

intermittently deflecting the continuous-flow ink stream with a gas jet made intermittently incident upon the continuous-flow ink stream to form an intermittently deflected ink stream, at least a portion of the at least one optical fiber intermittently entering the intermittently deflected ink stream forming wet marks on the outer surface of the at least one optical fiber;

drying the wet marks at a drying location to form dried marks; and applying a substantially transparent protective coating over the dried marks and the outer surface of the at least one optical fiber, wherein the dried marks are visible through the substantially transparent protective coating.

15. The method according to claim 1, further comprising catching, by the receptacle, the deflected ink stream at a position downstream of the optical fiber along the deflected ink stream path.

* * * * *